(12) United States Patent
Mouleeswaran et al.

(10) Patent No.: US 11,818,144 B2
(45) Date of Patent: *Nov. 14, 2023

(54) SECURITY APPLIANCE TO MONITOR NETWORKED COMPUTING ENVIRONMENT

(71) Applicant: Palo Alto Networks, Inc., Santa Clara, CA (US)

(72) Inventors: Chandra Mouleeswaran, Cupertino, CA (US); Wayne Jensen, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,683

(22) Filed: Apr. 11, 2022

(65) Prior Publication Data

US 2022/0239674 A1 Jul. 28, 2022

Related U.S. Application Data

(63) Continuation of application No. 16/218,462, filed on Dec. 12, 2018, now Pat. No. 11,303,651, which is a continuation-in-part of application No. 15/362,398, filed on Nov. 28, 2016, now Pat. No. 10,432,669.

(51) Int. Cl.
| | |
|---|---|
| *H04L 9/40* | (2022.01) |
| *H04L 41/14* | (2022.01) |
| *G06F 16/23* | (2019.01) |
| *G06F 16/2458* | (2019.01) |
| *G06F 16/901* | (2019.01) |
| *G06F 16/9032* | (2019.01) |
| *G06F 16/2455* | (2019.01) |
| *H04L 29/06* | (2006.01) |

(52) U.S. Cl.
CPC .......... *H04L 63/1408* (2013.01); *G06F 16/23* (2019.01); *G06F 16/2477* (2019.01); *G06F 16/24568* (2019.01); *G06F 16/9027* (2019.01); *G06F 16/90328* (2019.01); *H04L 41/145* (2013.01); *H04L 63/1425* (2013.01); *H04L 63/20* (2013.01)

(58) Field of Classification Search
CPC ..... H04L 63/1408; H04L 63/20; H04L 63/14; H04L 63/1433; H04L 41/145; G06F 16/24568; G06F 16/23; G06F 16/90328; G06F 16/2477; G06F 16/9027; G06F 21/50; G06F 21/552
See application file for complete search history.

(56) References Cited

U.S. PATENT DOCUMENTS

| | | | |
|---|---|---|---|
| 9,407,652 B1 * | 8/2016 | Kesin | H04L 67/535 |
| 2009/0019182 A1 * | 1/2009 | Riise | G06Q 10/00 |
| | | | 709/245 |
| 2014/0245443 A1 | 8/2014 | Chakraborty | |
| 2015/0341379 A1 | 11/2015 | Lefebvre et al. | |
| 2016/0112269 A1 | 4/2016 | Singh et al. | |
| 2016/0294948 A1 | 10/2016 | Chen | |

* cited by examiner

*Primary Examiner* — Edward Zee
(74) *Attorney, Agent, or Firm* — Gilliam IP PLLC

(57) ABSTRACT

A security appliance monitors streams of events and detects anomalous behavior by users with respect to software defined infrastructure. The security appliance creates baselines of activities for each user. After generating baselines, the security appliance compares events to the activity baselines of users to detect deviations. If a deviation is detected, then a violation report is generated.

20 Claims, 22 Drawing Sheets

RESOURCE: X, Time T1
{
  "vpcId": "vpc-abc123",
  "groupId": "sg-12345",
350 ↳  "ownerId": "12345",
  "groupName": null,
  "IpPermissions": [],
  "monitored": true
}

| Field Name (354) | Leaf Value Type (356) | (352) |
|---|---|---|
| 358 ↳ vpcId | String | |
| groupId | String | |
| ownerId | String | |
| 362 ↳ groupName | UNKNOWN | |
| 364 ↳ ipPermissions[*] | UNKNOWN | |
| 360 ↳ monitored | Boolean | |

RESOURCE: X, Time T2
"tags":[
  {
    "key": "name",
    "value": "Customer 123 Productions",
  }
],
"vpcId": "vpc-abc123",
"groupId": "sg-12345",
"ownerId": "12345",
"groupName": "local network",
"description": "Allow 22 in",
"IpPermissions": [
  {
    "toPort": 22,
    "fromPort": 22,
    "ipv4Ranges": [],
    "ipv6Ranges": [],
    "prefixListIds": [],
    "userIdGroupPairs": []
  }
]

352

| Field Name | Leaf Value Type |
|---|---|
| tags[*].key | String |
| tags[*].value | String |
| vpcId | String |
| ownerId | String |
| 368 ↳ groupName | String |
| 366 ↳ description | String |
| ipPermissions[*].toPort | Integer |
| ipPermissions[*].fromPort | Integer |
| ipPermissions[*].ipProtocol | String |
| 370 ↳ ipPermissions[*].ipv4Ranges[*] | UNKNOWN |
| ipPermissions[*].ipv6Ranges[*] | UNKNOWN |
| ipPermissions[*].prefixListIds[*] | UNKNOWN |
| ipPermissions[*].userIdGroupPairs | UNKNOWN |
| monitored | Boolean |

| Field Name | Type |
|---|---|
| ipPermissions[*].ipv6Ranges[*].description | String |
| groupId | String |
| ipPermissionsEgress[*].userIdGroupPairs[*].userId String | String |
| description | String |
| ipPermissions[*].ipv6Ranges[*].description | String |
| ipPermissionsEgress[*].userIdGroupPairs[*].userId | String |
| ipPermissionsEgress[*].toPort | String |
| ipPermissions[*].userIdGroupPairs[*].groupId | String |
| ownerId | String |
| ipPermissions[*].ipv6Ranges[*].cidripv6 | String |
| ipPermissions[*].toPort | Integer |
| vpcId | String |
| ipPermissions[*].userIdGroupPairs[*].userId | String |
| ipPermissionsEgress[*].fromPort | Integer |
| ipPermissions[*].ipRanges[*] | String |
| tags[*].key | String |
| ipPermissionsEgress[*].fromPort | String |
| tags[*].value | String |
| ipPermissionsEgress[*].ipv4Ranges[*].cdrip | String |
| ipPermissionsEgress[*].userIdGroupPairs[*].description | String |
| ipPermissions[*].userIdGroupPairs[*].description | String |
| ipPermissions[*].ipv6Ranges[*].cidripv6 | String |
| ipPermissionsEgress[*].ipProtocol | String |
| ipPermissionsEgress[*].ipv4Ranges[*].description | String |
| ipPermissionsEgress[*].userIdGroupPairs[*].groupId | String |
| ipPermissions[*].ipProtocol | String |
| groupName | String |
| ipPermissionsEgress[*].ipRanges[*] | String |
| ipPermissions[*].ipv4Ranges[*].description | String |
| ipPermissions[*].ipv4Ranges[*].cidrip | String |
| monitored | Integer |

| vpcId | String | Cloud Type | Service Type | Resource Name | API Name |

| Path Chosen | Leaf value type | Sample Recommendations |
|---|---|---|
| Singular field<br>Example:<br>description | String | contains, starts with, ends with |
| Partial path leading to multiple leaves<br>Example:<br>tags[*] | String | size greater than, size equals, size less than, contains, any start with, any end with etc. |

INVENTORY TABLE

| id | type | first_seen | last_seen |
|---|---|---|---|
| 1 | ACL | 2016-01-01T00:00:10Z | 2016-03-01T23:30:00Z |
| 2 | interface | 2016-03-01T09:00:33Z | 2016-03-01T09:02:00Z |
| 3 | Host | 2016-03-01T09:00:33Z | 2016-03-01T09:02:00Z |

ACL RULES TABLE

| acl_id | time | permission |
|---|---|---|
| 1 | 2016-01-01T00:00:10Z | "inbound TCP *:* to *:80" |

ACL ATTACHMENT TABLE

| resource_id | time | acl_id |
|---|---|---|
| 3 | 2016-03-01T09:00:33Z | 1 |

INTERFACE ATTACHMENT TABLE

| interface_id | time | attached_to | ip |
|---|---|---|---|
| 2 | 2016-03-01T09:00:33Z | 3 | [10.10.0.21, 93.184.216.34] |

ASSET PROPERTIES TABLE

| id | time | tag_key | tag_value |
|---|---|---|---|
| 3 | 2016-03-01T09:02:00Z | id | i-1001 |
| 3 | 2016-03-01T09:02:00Z | name | autotest-host |
| 3 | 2016-03-01T09:02:00Z | env | Production_web |

Query: new or changed asset configurations from 2016-03-01T00:00:00Z to 2016-03-02T00:00:00Z Scanning (id=3, time=2016-03-01T09:02:00Z, iface=[2], ACL=[1])

FIGURE 4

POLICY TABLE

| rule_id | asset_type | rule |
|---|---|---|
| 1 | Host | if asset.tag(env) !='production_web' then "No bound network from internet" |

(502, 504, 506, 508, 500)

470

Scanning (id=3,time=2016-03-01T09:02.00Z,iface=[2],ACL=[1])

VIOLATION REPORT

510

| | | |
|---|---|---|
| Message | Asset "autotest-host(i-1001)" of type "Host" violates rule "No inbound network from internet" | 518 |
| Network Query | netflow WHERE (src Isasset WITH tag("id", "i-1001")) OR (dst IS asset WITH tag("id","i-1001")) | 520 |
| Event Query | audit WHERE (object IS asset WITH id IN (1,2,3)) AND time between 2016-03-01T00:00:00Z AND 2016-03-01T09:02:00Z | 522 |

INVENTORY TABLE 404-1

| id | type | first_seen | last_seen |
|---|---|---|---|
| 1 | ACL | 2016-01-01T00:00:10Z | 2016-03-01T23:30:00Z |
| 2 | Interface | 2016-03-01T09:00:33Z | 2016-03-01T09:02:00Z |
| 3 | Host | 2016-03-01T09:00:33Z | 2016-03-01T09:02:00Z |
| 4 | MService | 2016-01-01T00:00:10Z | 2016-03-01T23:30:00Z |
| 5 | ACL | 2016-01-01T00:00:10Z | 2016-03-01T23:30:00Z |
| 6 | Interface | 2016-01-01T00:00:10Z | 2016-03-01T23:30:00Z |

STATIC RELATIONSHIP RULES TABLE 602

604 — Host has an Interface where Interface.attached_to = Host.id
618 — Host has an ACL where ACL Attachment.resource_id = Host.id
Interface has an IP Attachment
<All> has Properties where Properties.id = <All>.id
Managed Service has Hostname
Managed Service has Interface where Interface.ip contains resolve(ManagedService.Hostname)
Managed Service has an ACL where ACL Attachment.resource_id = ManagedService.id

ACL ATTACHMENT TABLE 430-1

| resource_id | time | acl_id |
|---|---|---|
| 3 | 2016-03-01T09:00:33Z | 1 |
| 4 | 2016-01-01T00:00:10Z | 5 |

ACL RULES TABLE 420-1

| acl_id | time | permission |
|---|---|---|
| 1 | 2016-01-01T00:00:10Z | Inbound TCP *:* to *:80 |
| 5 | 2016-01-01T00:00:10Z | Inbound TCP 10.10.0.0/23:* to *:6789 |

ASSET PROPERTIES TABLE 452-1

| id | time | tag_key | tag_value |
|---|---|---|---|
| 3 | 2016-03-01T09:02:00Z | id | i-1001 |
| 3 | 2016-03-01T09:02:00Z | name | autotest-host |
| 4 | 2016-01-01T00:00:10Z | name | prod-db |

614

INTERFACE ATTACHMENT TABLE 440-1

| interface_id | time | attached_to | ip |
|---|---|---|---|
| 2 | 2016-03-01T09:00:33Z | 3 | [10.10.0.21, 93.184.216.34] |
| 6 | 2016-1-01T00:00:10Z | 4 | [10.10.1.2] |

606

NETWORK FLOW TABLE 472

| time | proto | srcip | dstip | dstport | bytes |
|---|---|---|---|---|---|
| 2016-03-01-T08:58:00Z | udp | 10.10.0.147 | 10.10.1.191 | 123 | 100 |
| 2016-03-01-T09:01:10Z | tcp | 10.10.1.52 | 10.10.0.21 | 80 | 3000 |
| 2016-03-01-T09:01:30Z | tcp | 119.249.54.92 | 93.184.216.34 | 80 | 36000 |
| 2016-03-01-T09:01:30Z | | 10.10.0.21 | 10.10.1.2 | 6789 | 400 |

FIGURE 6-1

INFERRED RELATIONSHIP RULES TABLE

732

734 — CreateHost is followed within 30 seconds by AttachInterface with Subject=Root and AttachInterface.Objects contains CreateHost.Objects 736 — CreateHost is followed within 30 seconds by AssignIp with Subject=Root and prior AttachInterface.Objects contains CreateHost.Objects and AttachInterface.Objects contains AssignIp.Objects

...

INVENTORY TABLE

| id | type | first_seen | last_seen |
|---|---|---|---|
| 1 | ACL | 2016-01-01T00:00:10Z | 2016-03-01T23:30:00Z |
| 2 | Interface | 2016-03-01T09:00:33Z | 2016-03-01T09:02.00Z |
| 3 | Host | 2016-03-01T09:00:33Z | 2016-03-01T09:02.00Z |
| 4 | MService | 2016-01-01T00:00:10Z | 2016-03-01T23:30:00Z |
| 5 | ACL | 2016-01-01T00:00:10Z | 2016-03-01T23:30:00Z |
| 6 | Interface | 2016-01-01T00:00:10Z | 2016-03-01T23:30:00Z |
| 7 | Host | 2016-01-01T00:00:10Z | 2016-03-01T23:30:00Z |

404-2

OWNERS TABLE  712  714  716  710

| resource_id | time | owner_id |
|---|---|---|
| 3 | 2016-03-01T09:00:33Z | AutoTestScript |
| 4 | 2016-01-01T00:00:10Z | Bob |
| 7 | 2016-01-01T00:00:10Z | Alice |

718

ROLES TABLE 704  706

| id | permission |
|---|---|
| Alice | ListAssets,CrateHost,DeleteHost,EditAcl |
| AutoTestScript | CreateHost,DeleteHost |
| Bob | CreateDBMS,DeleteDBMS,EditAcl |

708  702

AUDIT EVENTS TABLE  722  724  726  728  730

| id | time | subject | action | object |
|---|---|---|---|---|
| 1 | 2016-03-01T09:00:33Z | AutoTestScript | CreateHost | 3 |
| 2 | 2016-03-01T09:00:35Z | Root | AttachInterface | 2,3 |
| 3 | 2016-03-01T09:00:35Z | Bob | EditAcl | 5 |
| 4 | 2016-03-01T09:00:40Z | Root | AssignIp | 2 |

Query: Audit WHERE object IS asset WITH id = 3 AND time BETWEEN 2016-03-01T09:00:33Z AND 2016-03-01T09:12:00Z  — 738

Event 2 related to event 1 via inferred rule
Event 4 related to event 1 via inferred rule  — 740

AUDIT EVENTS RESULTS TABLE

| time | subject | action | detail |
|---|---|---|---|
| 2016-03-01T09:00:33Z | AutoTestScript | CreateHost | i-1001 |
| 2016-03-01T09:00:35Z | Root | AttachInterface | ni-432, i-1001 |
| 2016-03-01T09:00:35Z | Bob | EditAcl | 5 |
| 2016-03-01T09:00:40Z | Root | AssignIP | ni-432, 10.10.0.21, 93.184.216.34 |

FIGURE 7-2

INVENTORY TABLE 404-3

| id | type | first_seen | last_seen |
|---|---|---|---|
| 1 | ACL | 2016-01-01T00:00:10Z | 2016-03-01T23:30:00Z |
| 2 | Interface | 2016-03-01T09:00:33Z | 2016-03-01T09:02:00Z |
| 3 | Host | 2016-03-01T09:00:33Z | 2016-03-01T09:02:00Z |
| 4 | MService | 2016-01-01T00:00:10Z | 2016-03-01T23:30:00Z |
| 5 | ACL | 2016-01-01T00:00:10Z | 2016-03-01T23:30:00Z |
| 6 | Interface | 2016-01-01T00:00:10Z | 2016-03-01T23:30:00Z |
| 7 | ACL | 2016-01-01T00:00:10Z | 2016-03-01T23:30:00Z |
| 8 | ACL | 2016-01-01T00:00:10Z | 2016-03-01T23:30:00Z |

ACL ATTACHMENT TABLE 430-2

| resource_id | time | acl_id |
|---|---|---|
| 3 | 2016-03-01T09:00:33Z | 1 |
| 4 | 2016-01-01T00:00:10Z | 5 |
| 3 | 2016-03-01T09:00:33Z | 7 |
| 3 | 2016-03-01T09:00:33Z | 8 |

ACL RULES TABLE 420-2

| acl_id | time | permission |
|---|---|---|
| 1 | 2016-01-01T00:00:10Z | "inbound TCP *:* to *:80" |
| 5 | 2016-01-01T00:00:10Z | inbound TCP 10.10.0.0/23:* to *:6789 |
| 7 | 2016-01-01T00:00:10Z | inbound TCP 10.10.0.0/23:* to *:22 |
| 8 | 2016-01-01T00:00:10Z | inbound TCP 10.10.0.0/23:* to *:80 |

INTERFACE ATTACHMENT TABLE 440-2

| interface_id | time | attached_to | ip |
|---|---|---|---|
| 2 | 2016-03-01T09:00:33Z | 3 | [10.10.0.21, 93.184.216.34] |
| 6 | 2016-1-01T00:00:10Z | 4 | [10.10.1.2] |

ASSET PROPERTIES TABLE 452-2

| id | time | tag_key | tag_value |
|---|---|---|---|
| 3 | 2016-03-01T09:02:00Z | id | i-1001 |
| 3 | 2016-03-01T09:02:00Z | name | autotest-host |
| 4 | 2016-01-01T00:00:10Z | name | prod-db |

NETWORK FLOW TABLE 472-1

| time | proto | srcip | dstip | dstport | bytes |
|---|---|---|---|---|---|
| 2016-03-01-T08:58:00Z | udp | 10.10.0.147 | 10.10.1.191 | 123 | 100 |
| 2016-03-01-T09:01:10Z | tcp | 10.10.1.52 | 10.10.0.21 | 80 | 3000 |
| 2016-03-01-T09:01:30Z | tcp | 119.249.54.92 | 93.184.216.34 | 80 | 36000 |
| 2016-03-01-T09:01:30Z | tcp | 10.10.0.21 | 10.10.1.2 | 6789 | 400 |

FIGURE 8-1

802 Query: ACLs used by network traffic where source or destination is "i-1001" and time between 2016-03-01-T09:00:00Z and 2016-03-01-T09:13:00Z

804 Intermediate data: IP related to asset with tag("id")="i-1001" == [10.10.0.21, 93.184.216.34]

806 Intermediate data: network traffic where srcip or destip in [10.10.0.21, 93.184.216.34] and time between 2016-03-01-T09:00:00Z and 2016-03-01-T09:13:00Z

| time | proto | srcip | dstip | dstport | bytes |
|---|---|---|---|---|---|
| 2016-03-01-T09:01:10Z | tcp | 10.10.1.52 | 10.10.0.21 | 80 | 3000 |
| 2016-03-01-T09:01:30Z | tcp | 119.249.54.92 | 93.184.216.34 | 80 | 36000 |
| 2016-03-01-T09:01:30Z | tcp | 10.10.0.21 | 10.10.1.2 | 6789 | 400 |

816 · 808

810 For each network flow, evaluate each ACL attached to asset attached to an interface with IP address containing the destination IP of the flow. Tag ACLs which would allow this flow

ACL RESULTS TABLE

| flow row # | acl_id | would_allow |
|---|---|---|
| 1 | 1 | true |
| 1 | 7 | false |
| 1 | 8 | true |
| 2 | 1 | true |
| 2 | 7 | false |
| 2 | 8 | false |
| 3 | 5 | true |

814  818  820  812
822  830

832 Result: 1,8,5

FIGURE 8-2

INVENTORY TABLE 404-4

| id | type | first_seen | last_seen |
|---|---|---|---|
| 1 | ACL | 2016-01-01T00:00:10Z | 2016-03-01T23:30:00Z |
| 2 | Interface | 2016-01-01T09:00:33Z | 2016-03-01T23:30:00Z |
| 3 | Host | 2016-01-01T09:00:33Z | 2016-03-01T23:30:00Z |

ACL RULES TABLE 420-3

| acl_id | time | permission |
|---|---|---|
| 1 | 2016-01-01T00:00:10Z | Inbound TCP *:* to *:80 |
| 5 | 2016-02-10T08:00:00Z | Inbound TCP 10.10.0.0/23:* to *:6789 |
| 5 | 2016-02-12T09:20:00Z | Inbound TCP 10.10.0.0/23:* to *:6789 |

ACL ATTACHMENT TABLE 430-3

| resource_id | time | acl_id |
|---|---|---|
| 3 | 2016-03-01T09:00:33Z | 1 |

INTERFACE ATTACHMENT TABLE 440-3

| interface_id | time | attached_to | ip |
|---|---|---|---|
| 2 | 2016-03-01T09:00:33Z | 3 | [10.10.0.21, 93.184.216.34] |

ASSET PROPERTIES TABLE 452-3

| id | time | tag_key | tag_value |
|---|---|---|---|
| 3 | 2016-03-01T09:02:00Z | id | i-1001 |
| 3 | 2016-03-01T09:02:00Z | name | autotest-host |
| 3 | 2016-03-01T09:02:10Z | env | Production_web |

AUDIT EVENT TABLE 720-1

| id | time | subject | action | object |
|---|---|---|---|---|
| 1 | 2016-02-01T07:53:10Z | Alice | EditAcl | 1 |
| 2 | 2016-02-12T09:17:35Z | Alice | EditAcl | 1 |
| 3 | 2016-03-01T09:00:35Z | Bob | EditAcl | 5 |
| 4 | 2016-03-01T09:00:40Z | Root | AssignIp | 2 |

POLICY TABLE 500-1

| rule_id | asset_type | rule |
|---|---|---|
| 1 | Host | If asset.tag(env) != 'production_web' then "No inbound network from internet" |

FIGURES 9-1

Scan new or changed asset configurations from 2016-01-01T00:00:00Z to 2016-03-01T00:00:00Z ⟿ 902

VIOLATION REPORT

| | | |
|---|---|---|
| Message | Asset "autotest-host(i-1001)" of type "Host" violates rule "No inbound network from internet" | 906 |
| Network Query | netflow WHERE (src IS asset WITH tag("id","i-1001")) OR (dst IS asset WITH tag("id","i-1001")) | |
| Event Query | audit WHERE(object IS asset WITH id IN (1,2,3)) AND time between 2016-02-10T07:50:00Z AND 2016-02-12T09:30:00Z | |

Query: audit WHERE (object IS asset WITH id IN (1,2,3)) AND time between 2016-02-10T07:50:00Z AND 2016-02-12T09:30:00Z ⟿ 908

| id | time | subject | action | object | |
|----|------|---------|--------|--------|---|
| 1 | 2016-02-01T07:53:10Z | Alice | EditAcl | 1 | 910 |
| 2 | 2016-02-12T09:17:35Z | Alice | EditAcl | 1 | |

FIGURE 9-2

USER BASELINE TABLE

1002

| User | feature | value |
|---|---|---|
| Alice | ConsoleLogin source | 50.250.197.200/29 \| 97.84.95.208/32 |
| Alice | ConsoleLogin geo | US |
| Alice | API volume EditAcl | 1.4 |
| Alice | API volume CreateHost | 0.2 |

1004, 1006, 1008, 1010, 1012, 1014, 1016

AUDIT EVENT TABLE 720-2, 1018

| id | time | subject | action | object | source |
|---|---|---|---|---|---|
| 1 | 2016-02-01T07:50:20Z | Alice | ConsoleLogin | n/a | 50.250.197.204 |
| 2 | 2016-02-10T07:53:10Z | Alice | EditAcl | 1 | 50.250.197.204 |
| 3 | 2016-02-12T09:15:00Z | Alice | ConsoleLogin | n/a | 97.84.95.208 |
| 4 | 2016-02-01T09:17:350Z | Alice | EditAcl | 1 | 97.84.95.208 |
| 5 | 2016-03-01T09:00:35Z | Alice | ConsoleLogin | n/a | 155.133.82.159 |
| 6 | 2016-03-01T09:00:40Z | Alice | CreateHost | 10 | 155.133.82.159 |
| 7 | 2016-03-01T09:00:41Z | Alice | CreateHost | 11 | 155.133.82.159 |
| 8 | 2016-03-01T09:00:41Z | Alice | CreateHost | 12 | 155.133.82.159 |
| 9 | 2016-03-01T09:00:41Z | Alice | CreateHost | 14 | 155.133.82.159 |
| 10 | 2016-03-01T09:00:41Z | Alice | CreateHost | 15 | 155.133.82.159 |

Monitor event stream — 1020

Excessive deviation from baseline: Alice-ConsoleLogin source, Alice-ConsoleLogin geo, API volume CreateHost — 1022

VIOLATION REPORT

| | | |
|---|---|---|
| Message | Excessive deviation from baseline: Alice-ConsoleLogin source (155.133.82.159), Alice-ConsoleLogin geo (PL), API volume CreateHost (5) | 1024 |
| Network Query | netflow WHERE (src IS asset WITH id IN (10,11,12,14,15)) OR (dst IS asset WITH id IN (10,11,12,14,14)) | |
| Event Query | audit WHERE(subject=Alice) AND time between 2016-03-01T09:00:35Z AND 2016-03-01T09:10:41Z | |

FIGURE 10

REMEDIATION CONFIGURATION TABLE

| On violation | Remedy parameters | Remedy action |
|---|---|---|
| Abnormal console activity | assets = Query(ViolationReport.EventQuery).objects | public-cloud-login(username = AutomatedEnforce, password = xxxxx)<br><br>public-cloud-detach-acl(asset-id = $1, *)<br><br>public-cloud-attach-acl(asset-id = $1, acl-rule = "inbound TCP 10.10.0.1:* *:22")<br><br>public-cloud-attach-acl(asset-id = $1, acl-rule = "DENY outbound * *:* *:*") |

1102, 1106, 1108, 1110, 1112

VIOLATION REPORT

| Message | Excessive deviation from baseline: Alice - ConsoleLogin source (155.133.82.159), Alice - ConsoleLogin geo (PL), API volume CreateHost (5) |
|---|---|
| Network Query | netflow WHERE (src IS asset WITH id IN (10,11,12,14,15)) OR (dst IS asset WITH id IN (10,11,12,14,15)) |
| Event Query | audit WHERE (subject = 'Alie') AND time between 2016-03-01T09:00:35Z AND 2016-03-01T09:10.41Z |

1104

Perform remedial action — 1114

FIGURE 11

SECURITY APPLIANCE TO MONITOR NETWORKED COMPUTING ENVIRONMENT

TECHNICAL FIELD

The present invention relates generally to a security appliance and, more particularly, to a security appliance to monitor a networked computing environment, for example, a software defined infrastructure.

DESCRIPTION OF RELATED ART

Software defined infrastructure (SDI) computing environments, sometimes referred to as public or private cloud computing environments, provide a defined set of computing resources for a user to use. SDIs offer greater agility for users of computing resources. SDIs may be configured as a virtual computing environment, where portions of physical computing resources may be allocated to a user for use. For example, based upon needs of a user, a SDI may be configured or reconfigured to provide less or more computing resources. In advanced SDI environments, re-provisioning of computing resources may be automatically done without involvement of IT staff or hardware acquisition. This freedom to deploy computing resources automatically, based on the need of a user may present challenges for maintaining compliance with corporate security policy, as users may configure assets in violation of policy through ignorance or error.

As resources or assets in a SDI may change periodically, traditional methods for ensuring compliance with corporate security policy by using a gatekeeper for assets or periodically scanning the assets for compliance may not be sufficient. For example, at the time of scanning the assets for compliance, assets present in a SDI may be different than assets present between scanning.

It may be desirable to provide a security appliance that can monitor SDIs with changing virtual computing resources or assets. It is with these needs in mind, this disclosure arises.

SUMMARY OF THE INVENTION

In one embodiment, a method for evaluating a software defined infrastructure is disclosed. The method includes retrieving data associated with a resource in the software defined infrastructure by a security appliance, the data stored in a tree structure. Selective information for the resource is extracted from the retrieved data. A NI model is generated for the resource, the NI model including a plurality of fields and associated value type for each of the fields. A path document is generated for each of the fields of the NI model. The path document includes a plurality of attributes related to the resource in the software defined infrastructure. The generated path document is stored in a data store of the security appliance.

In yet another embodiment, a security appliance to evaluate a software defined infrastructure is disclosed. The security appliance includes a data ingestion and query engine. The data ingestion and query engine is configured to retrieve data associated with a resource in the software defined infrastructure, the data stored in a tree structure, extract selective information from the retrieved data, and store extracted selective information in a plurality of data store. A NI model is generated for the resource, the NI model including a plurality of fields and associated value type for each of the fields. A path document is generated for each of the fields of the NI model. The path document includes a plurality of attributes related to the resource in the software defined infrastructure. The generated path document is stored in a data store of the security appliance.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIGS. 3B, 3C and 3D shows an example NI model development for resource X, over a time period, according to an example of this disclosure;

FIG. 3E shows an example path document generated, according to an example of this disclosure;

FIG. 3F shows a table with recommendations based on the path chosen and leaf value type, according to an example of this disclosure;

FIG. 3I shows an example merging of data retrieved for two resources and minimization of merged data, according to an example of this disclosure;

FIG. 4 shows selective data in a plurality of data stores of the security appliance, and processing of the data in the plurality of data stores based on a received query, according to an example of this disclosure;

FIG. 5 shows an example policy table, processing of a query for compliance to a policy and an example violation report, according to an example of this disclosure;

FIGS. 6-1 and 6-2 shows selective data in a plurality of data stores of the security appliance, processing of the data in the plurality of data stores based on a received query, and generating a directed graph, according to an example of this disclosure;

FIGS. 7-1 and 7-2 shows selective data in a plurality of data stores of the security appliance, processing of the data in the plurality of data stores based on a received query, and generating an audit events results table, according to an example of this disclosure;

FIGS. 8-1 and 8-2 shows selective data in a plurality of data stores of the security appliance, processing of the data in the plurality of data stores based on a received query, and generating an ACL results table, according to an example of this disclosure;

FIGS. 9-1 and 9-2 shows selective data in a plurality of data stores of the security appliance, processing of the data in the plurality of data stores based on a received query, and generating a violation table, according to an example of this disclosure;

FIG. 10 shows selective data in a plurality of data stores of the security appliance, evaluating the data in the plurality of data stores based on a user baseline, and generating a violation report based on a deviation from the baseline, according to an example of this disclosure;

FIG. 11 shows an example remediation configuration table and initiation of a corrective action based on a violation report, according to an example of this disclosure.

DETAILED DESCRIPTION

Figure 1:
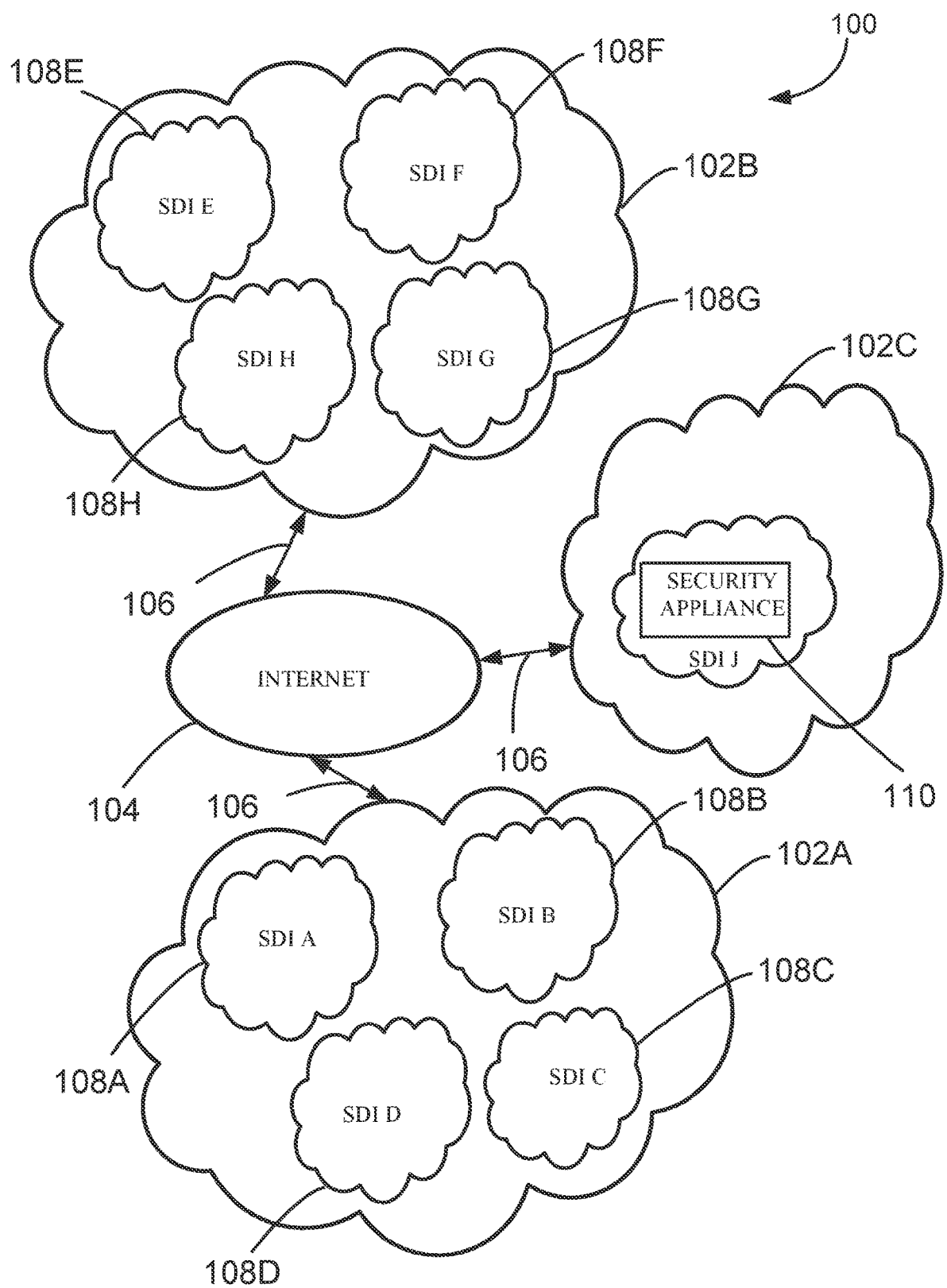
FIG. 1 shows an example network computing environment, with a plurality of software defined infrastructures, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a security appliance to monitor one or more software defined infrastructures. Referring now to the drawings, where similar reference characters denote corresponding features consistently throughout the figures, various examples of this disclosure is described.

FIG. 1 depicts an example network computing environment 100. The network computing environment 100 may have a plurality of cloud computing resources, for example, cloud computing resources 102A, 102B and 102C, all connected to internet 104, over link 106. Cloud computing resources 102A, 102B and 102C may be similar, in the sense provided by a single vendor, for example, Amazon or Microsoft. In some examples, the cloud computing resources 102A, 102B and 102C may be dissimilar, for example, the cloud computing resource 102A may be provided by Amazon, cloud computing resource 102B may be provided by Microsoft and cloud computing resource 102C may be provided by yet another vendor.

Each of the cloud computing environment 102A, 102B and 102C may include one or more software defined infrastructures (SDIs). For example, the cloud computing environment 102A has SDIs 108A-108D deployed or running, the cloud computing environment 102B has SDIs 108E-108H deployed or running, and the cloud computing environment 102C has SDI 108J deployed or running. As one skilled in the art appreciates, one or more of the SDIs may be deployed automatically, with minimal or no interaction from an administrator, based on one or more rules. For example, these rules may define the amount and type of computing resources to be allocated to a particular SDI. In some examples, the amount and type of computing resources allocated to a particular SDI may dynamically change, due to changing demands on the computing resource.

The security appliance 110 of this disclosure may be executed on any of the SDIs. In one example, the security appliance 110 is executed on the SDI 108J, provisioned on cloud computing environment 102C. The security appliance may be configured to monitor one or more SDIs provisioned on cloud computing environments. For example, the security appliance 110 may be configured to monitor one or more of SDI 108A-108D running on cloud computing environment 102A, one or more of SDI 108E-108H running on cloud computing environment 102B.

Figure 2:
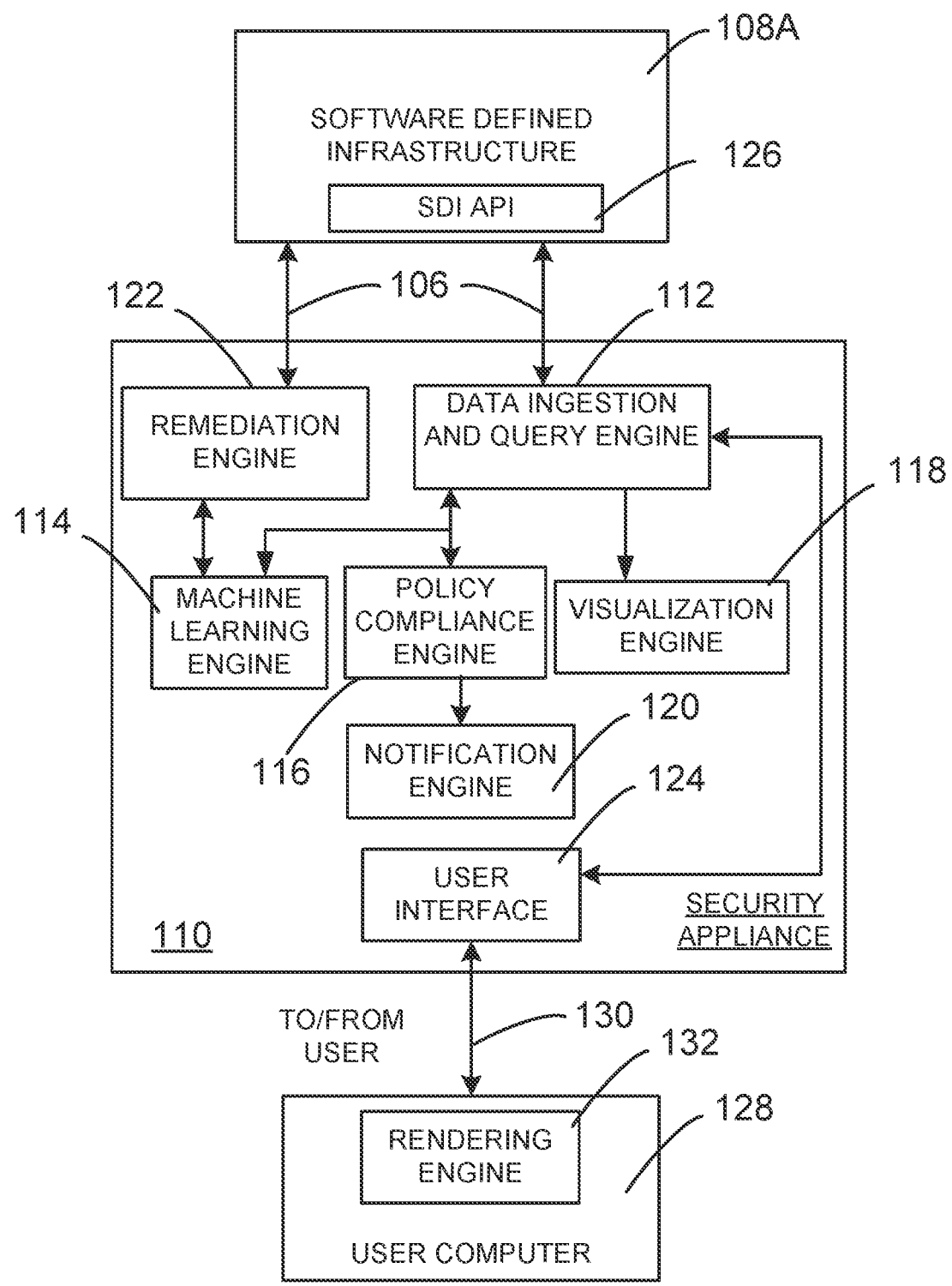
FIG. 2 shows an example block diagram of a security appliance, according to an example of this disclosure.

FIG. 2 shows an example block diagram of a security appliance 110. The security appliance 110 includes a data ingestion and query engine 112 (DIQ engine), a machine learning engine 114 (ML engine), a policy compliance engine 116 (PC engine), a visualization engine 118, a notification engine 120, a remediation engine 122 and a user interface 124.

The security appliance 110 is configured to communicate with a SDI, for example, SDI 108A, over link 106. In one example, the security appliance 110 communicates with SDI 108A using a SDI API 126. The security appliance 110 is also configured to communicate with a user computer 128, over link 130. In some examples, the link 130 may be a link over internet 104, for example, link 106 shown in FIG. 1. In some examples, the user interface 124 of the security appliance 110 may communicate with a rendering engine 132 executed on the user computer 128.

The DIQ engine 112 is configured to receive raw metadata about assets, audit events and network flow of a SDI that is being monitored by the security appliance 110. For example, the DIQ engine 112 may access various data sources of the SDI 108A, using the SDI API 126. The DIQ engine 112 also provides a query interface to access various data stored or accessible by the DIQ engine 112. Functions and features of the DIQ engine 112 will be further described in detail, with reference to FIG. 3.

The policy compliance engine 114 interacts with the DIQ engine 112 to receive various records and attributes related to assets of the SDI 108A. The policy compliance engine 114 further compares policies set for various assets of the SDI 108A against actual attributes of various assets of the SDI 108A. As one skilled in the art appreciates, in some examples, a scan of the assets for compliance may be triggered based on a preset schedule set by a user. In some examples, the scan of the assets for compliance may be triggered in response to a predefined activity related to an asset, for example, when a new asset is deployed. During a scan for compliance, configurations of each of the assets since the time of the last scan are compared to the defined policies for that type of asset. Based on the comparison, the policy compliance engine 116 determines any deviation from the set policies and generates appropriate violation reports.

In some examples, the violation reports are consumed by the notification engine 120 to generate appropriate messages to a user or administrator of the SDI 108A to communicate to the user details of the violations for further action. The notification engine 120 may dispatch details of violations by various methods. For example, in some examples, details of violations may be communicated to a user using e-mail, pager, text message and the like. In some examples, a message indicative of the violation may be configured to be submitted to an external ticketing system, for further action. In some examples, the message indicative of the violation may be submitted to an aggregation system configured to receive various violation reports from a plurality of SDIs monitored by the security appliance 110.

In some examples, the violation report may trigger an automatic corrective action for an asset of the SDI 108A, triggered by the remediation engine 122. The remediation engine 122 is configured to interact with the SDI 108A over the SDI API 126. The corrective action may include adjusting the configuration of an asset of the SDI 108A so that it matches a desired state, or injecting firewall rules to isolate an asset of the SDI 108A. This feature will be further explained in detail with reference to FIG. 11.

The machine learning engine 114 is configured to evaluate various change events for an asset and infer certain relationships between these events, for example, using sequential pattern mining. This feature will be further explained in detail later with reference to FIG. 8. In some examples, the machine learning engine 114 is configured to flag certain audit events as higher priority based on deviation from a baseline behavior for actions committed by a user. This feature will be further explained in detail later with reference to FIG. 9. In some examples, the machine learning engine 114 may automate grouping of assets by similarity of workload based on network flow data. This feature will be further explained in detail later with reference to FIG. 10. In some examples, the machine learning engine 114 may detect and flag an anomalous network activity. This feature will be further explained in detail later with reference to FIG. 10.

Visualization engine 118 is configured to convert results provided by the DIQ engine 112 into a visualization record. The visualization record may contain data to render a directed graph, for example, a graph with nodes and edges. Nodes represent elements of a result, for example, a search result that are grouped together using rules. Rules may be provided by a user or may be set as a default parameter in the security appliance 110. An example rule may be, "group elements having the same value for a given attribute (or tag) property with name=X. Edges between nodes represent some activity between one node and another node.

For example, in a network visualization, edges may represent flow of data between two nodes representing a computing device. In some examples, the edges may be directional. For example, in a network visualization, direction of the edge may indicate which node initiated the communication. In the case of an audit visualization, edges may represent actions, with the direction of edge indicative of which node is the subject and which node is the object. The graph may further include metadata for each node and edge. For example, in a network visualization, node metadata may indicate names and IP address of hosts within a node. Edge metadata may indicate traffic volumes, destination port number, and traffic classification and the like. An example of a directed graph will later be described in detail.

In some examples, a rendering engine 132 may be configured to receive the visualization record and present the visualization record in a human readable form on a display device, for example, a display device of the user computer 128. In some examples, the rendering engine 132 may be a program executed on a browser of the user computer 128.

Figure 3:
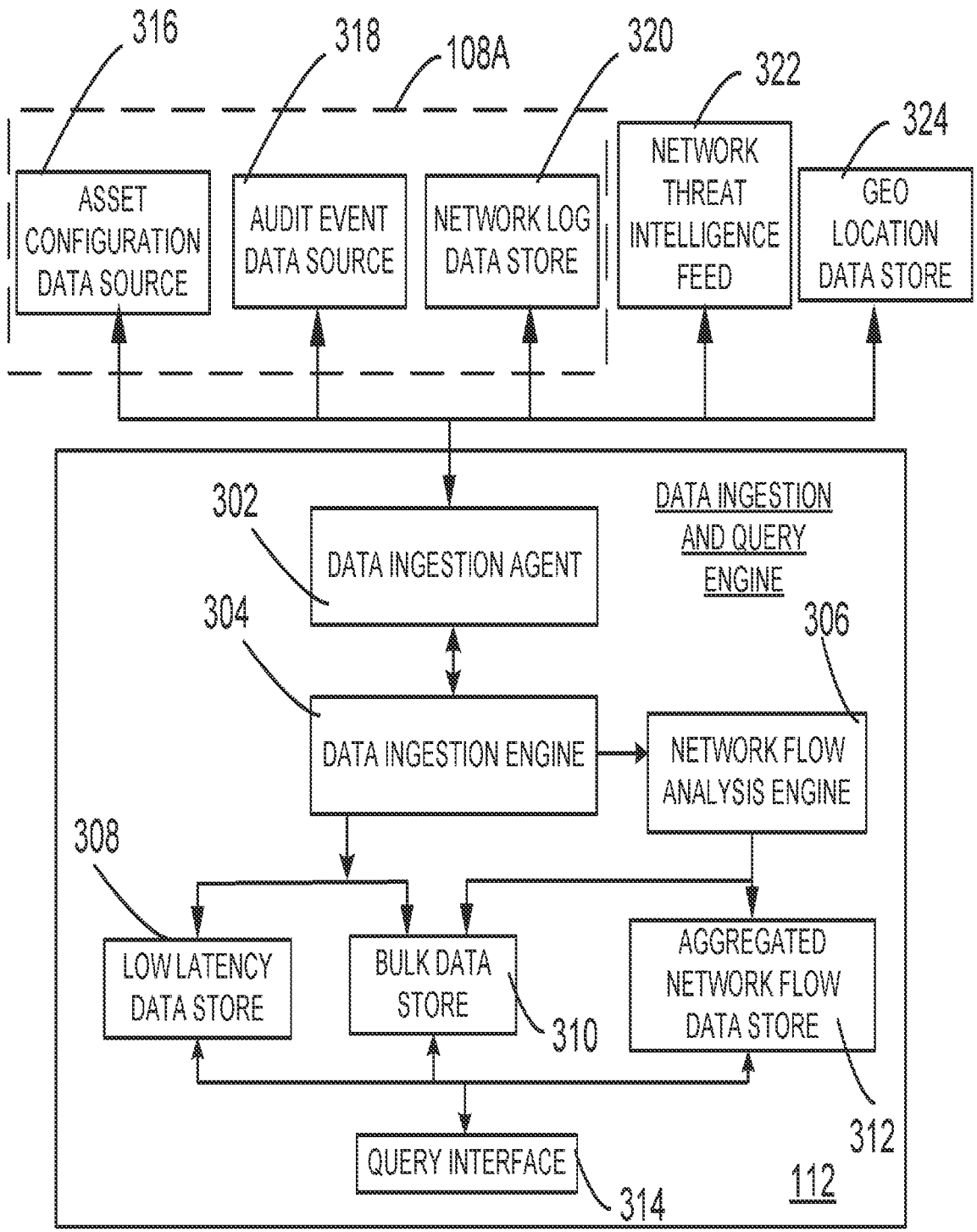
FIG. 3 shows an example block diagram of a data ingestion and query engine of the security appliance of FIG. 2, according to an example of this disclosure.

Now, referring to FIG. 3, an example DIQ engine 112 is further described. The DIQ engine 112 includes a data ingestion agent 302, a data ingestion engine 304, a network flow analysis engine 306, a low latency data store 308, a bulk data store 310, an aggregated network flow data store 312 and a query interface 314.

The data ingestion agent 302 is configured to communicate with external data stores and retrieve data into the DIQ engine 112. For example, the data ingestion agent 302 may communicate with one or more data stores of a SDI, for example, SDI 108A. For example, an asset configuration data store 316, an audit event data store 318 and a network log data store 320.

The asset configuration data store 316 may have details about various assets deployed in the SDI. For example, virtual machine (VM) running containers, images used to launch containers, images used to launch VM instances, virtual network interfaces, virtual network subnets, managed data bases, managed flow bouncers. Additionally, the asset configuration data store 316 may also contain details about users, infrastructure, reports of user activities and the like.

The audit event data store 318 may contain notifications generated by the SDI when a user takes some infrastructure activity. For example, an infrastructure activity like launching, stopping or deleting infrastructure. Infrastructure activity may also include logging into a control console of the SDI and making modifications to the infrastructure. The network log data store 320 may contain records of network traffic within the SDI as well as network traffic over the internet.

In some examples, the data ingestion agent 302 may communicate with SDI API 126 of the SDI 108A to access and retrieve data from asset configuration data store 316, audit event data store 318 and network log data store 320. In some examples, the SDI 108A may not provide an API to access various SDI data stores. In such examples, an agent (not shown) may be run in the SDI 108A to access various SDI data stores.

In some examples, the data ingestion agent 302 may also communicate with external data sources like a network threat intelligence feed 322 and geo location data store 324. The network threat intelligence feed 322 may provide IP addresses associated with suspicious or malicious activities. The geo location data store 324 may provide mapping of IP addresses to physical location. For example, country, state, county and city associated with the IP address may be provided. In some examples, IP addresses associated with an IP service provider is also provided.

The data ingestion agent 302 retrieves or collects data from various data stores. The format of the data received may be proprietary to a specific SDI or source. The data ingestion agent 302 normalizes the received data into a known format and provides the normalized data to the data ingestion engine 304.

The data ingestion engine 304 processes the received normalized data from the data ingestion agent 302. Data related to network flow may be further processed by the network flow analysis engine 306. The network flow analysis engine 306 determines which party initiated the network communication. Network flow analysis engine 306 may also use one or more rules to deduce the roles of a party to a network communication. For example, if a network communication occurred from a server over port 80, then, the network communication is an indication of communication over the internet. In other words, a network communication that occurred to an external system. This information may be appropriately stored with the network communication data. For example, aggregated network flow data may be stored in the aggregated network flow data store 312. In some examples, the aggregated network flow data store 312 may be a large volume data store that may provide reasonable access to retrieve stored data in response to a query. Raw network flow data is stored in a bulk data store 310. Data stored in the bulk data store 310 may be used by background processes executed on the security appliance 110, For example, the machine learning engine 114 of the security appliance 110 may use data stored in the bulk data store 310 to analyze data.

Information related to asset configuration and audit event data are stored in a low latency data store 308. Low latency data store 310 is configured to provide quick access to stored data, with minimal latency. Some of the asset configuration and audit event data may also be stored in the bulk data store 310. Data from network threat intelligence feed 322 and geo location data store 324 may be serialized by the data ingestion engine 304 and stored in the low latency data store 308.

The query interface 314 of the DIQ engine 112 is configured to receive requests from external processes or engines. For example, requests may be received from policy compliance engine 116, machine learning engine 114 or the user interface 124 of the security appliance 110. The query interface 314 is configured to provide a set of query APIs with specialized functions as well as interpreters for certain domain specific query language. The query interface 312 examines the query input and determine what type of data is required to satisfy the query. Based on the determination, the query interface 312 composes appropriate queries to specific data store, for example, one or more of the low latency data store 308, bulk data store 310 and aggregated network flow data store 312.

As an example, for a query request requesting network data related to assets that are tagged with a "production environment" tag, the query interface 312 may generate a sub-query to low latency data store 308 to retrieve IP addresses for all assets that carry a tag of "production environment". The retrieved results of that sub-query from low latency data store 308 (which are IP addresses) may be used by the query interface 312 to generate another query to the aggregated network flow data store 312 to retrieve only those network flow data corresponding to the retrieved IP addresses. The retrieved network flow data is then returned as the result for the initial query by the query interface 312. As one skilled in the art appreciates, the retrieved network flow data corresponds to network data related to assets that are tagged with a "production environment".

As another example, the query interface 312 may receive a query to provide a network graph of all assets in a particular virtual network. In this example, the query interface 312 will generate a query to the aggregate network flow data store 312 to retrieve all network traffic related to the requested particular virtual network. The assets of the retrieved network traffic are then mapped to a corresponding IP address based on the data stored in the low latency data store 308, for example, by generating a series of appropriate queries by the query interface 312 to the low latency data store 308. Then, the network traffic information and asset configuration details are sent to the visualization engine 118 of the security appliance 110. The visualization engine 118 will communicate with the rendering engine 132 to generate and present the network graph on a display device of the user computer 128 as previously described with reference to FIG. 2.

In some environments, business units or users may be permitted to deploy assets within a virtual environment, for example, a SDI automatically, based on their needs. Once the needs are met, the deployed assets are decommissioned promptly. These decommissioned assets may be sometimes referred to as ephemeral assets, as they are commissioned and decommissioned within a short period of time. Generally, details of the deployed and later decommissioned assets (ephemeral assets) are available for a short period after the decommissioning, for example, an hour after the decommissioning. Thereafter, the SDI may not retain information related to these ephemeral assets. As the security appliance 110 of this disclosure periodically accesses various data stores of the SDI, for example, the asset configuration data store 315, audit event data store 318 and network log data store 320, retrieves the data and stores corresponding data in the data stores of the DIQ engine 112, a user can query the data stores of the DIQ engine 112 at a later time to determine various activities that occurred in a SDI over a period of time, even as related to ephemeral assets.

In some examples, one or more queries may be stored in a database for later use. In some examples, it may be desirable to generate or craft a query in real time, based on various attributes. One or more of these queries may refer to a policy to be implemented for the software defined infrastructure previously described with reference to FIGS. 1 and 2. In some examples, a query may be referred to as a rule. An example dynamic policy generator 330 (sometimes referred to as DP generator) is described with reference to FIG. 3A. As one skilled in the art appreciates the DP generator 330 may be part of the DIQ engine 112. In some examples, the DP generator 330 may be part of the query interface 314 of the DIQ engine 112.

Figure 3A:
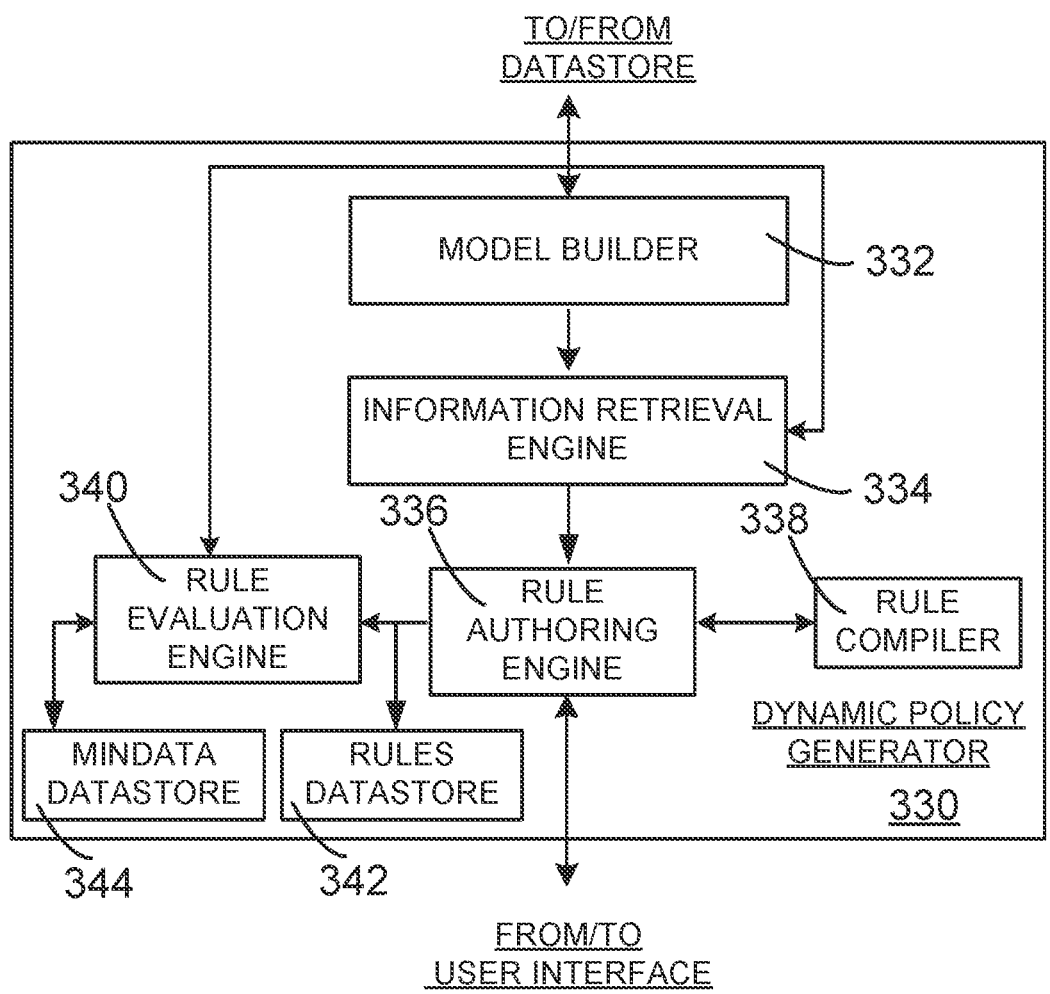
FIG. 3A shows an example block diagram of a dynamic policy generator, according to an example of this disclosure.

Now, referring to FIG. 3A, the DP generator 330 is described. The DP generator 330 includes a model builder 332, an information retrieval engine 334, a rule authoring system 336, a rule compiler 338. The DP generator 330 additionally has a rule evaluation engine 340, a rules data store 342 and a mindata datastore 344. The model builder 332 builds a model for each of the resources of the SDI for a given period of time. Data about each of the SDI may be represented in a tree structured data that may span many levels. The node in the tree may have a branching factor of one or more. The leaves of the tree contain one of the following value types: integer, string, float, boolean, double and null.

Data about each of the SDI is sampled over a predefined time period to enable building a navigation and interpretation model (sometimes referred to as "NI model" or just "model"). The model so built is a map between normalized paths in the tree structured resources and the type of value that may be found in the leaf. When dealing with array nodes in the tree, the model creates a normalized path that applies to all the children. Initially a pilot model is built, by sampling one of the records. The pilot model will include some fields that are fully specified and some fields with null values, marked as unknowns. The model builder scans additional samples to incrementally populate the model by performing union with fully specified fields and updating unknowns, either adding additional fields or updating fields with known value types. The model builder completes scanning all available samples to update the pilot model. The pilot model is considered to be a complete model when there are no null value fields in the model. This will be further explained with reference to FIGS. 3B, 3C and 3D.

The information retrieval engine 334 is configured to retrieve data both from the model builder 332 and one or more databases 316, 318 and 320 of the SDI 108A. In some examples, the information retrieval engine 334 may retrieve data from one or more databases 316, 318 and 320 of the SDI 108A using data ingestion agent 302 of the data ingestion and query engine 112, as previously described with reference to FIG. 3. The information retrieval engine 334 generates one or more path documents in the retrieval system, for each of the resources. In one example, each path document may refer to data contained in a row of the model created by the model builder, with additional information fields. In one example, an address to a path document may be indexed for easy access. Each path document in the retrieval system contains a unique path and additional associated information like cloud type, resource name, service name, set of applicable operators and suggested values. The cloud type, resource name and service name are derived from the mappings provided in the database schemas of the SDI. The applicable operators are extracted from the normalized paths and the type of value stored against that path.

For a single value field, normalization is not required. For array paths, normalization refers to converting the path to represent a generic node that captures all of the children under that node. Field value type could be numeric, boolean, array or object specific. Relevant operators apply both for the completed path (up to the leaf) of the tree as well as partial paths (intermediate nodes).

The rule authoring system 336 is configured to provide context sensitive help to a user, when a rule is being formed by a user. For example, the rule authoring system 336 monitors keywords entered by the user in a query editor presented to the user on an input-output device. The rule authoring system 336 evaluates the keywords entered by the user and provides help or guidance to the user. The guidance provided to a user may include extending field names, selecting operators, selecting values, extending to additional conditions and performing joins across resources. As the rule formation continues, the rule authoring system 336 continuously validates the rule for acceptance.

The rule compiler 338 communicates with the rule authoring system 336 to present possible rule completion scenarios to a user. As the rule construction progresses, the existing string from the query editor is sent to the rule complier 338. If a rule is incomplete, the rule compiler 338 returns possible completion scenarios back to the rule authoring system 336, which is presented to the user. The cycle of editing and compilation of the rule continues until the rule is completed as per defined grammar.

The rule compiler 338 in one example, contains finite automatons generated from two levels of grammar rules. First level of automaton is compiled from a set of grammar rules that represent the rules used by the rule editor. A rule is a predicate of the form "<path> <operator> [<operand>]. The <path> may represent a single value in the tree structured resource or a set of values. The <operand> may be of types boolean, string, integer, double, float or null. The model built by the model builder 332 is used to guide possible value in each of <path>, <operator> and <operand>. Within <path>, keyword search is allowed, with the results rank ordered of the best match, from left to right. The <operand> set is computed from <path>.

Once a rule is completed and validated, the rule may be sent for evaluation, for a defined period of time. Based on the evaluation, a result may be obtained. Rule evaluation engine 340 may be configured to receive the rule and retrieve data from one or more databases of the SDI 108A, for the applicable time window. As one skilled in the art appreciates, one or more of the rules so created may be stored in a data store for future use. For example, a rules data store 342 may be provided to store the created rules. In one example, the rules data store 342 may be part of the dynamic policy generator 330. In one example, the rules data store 342 may be part of the DIQ engine 112. In one example, the rules data store 342 may be part of the security appliance 110.

Having described various functions and features of the DP generator 330, an example NI model built by the model builder 332 for cloud resource X is now described with reference to FIGS. 3B, 3C and 3D. Now, referring to FIG. 3B, during time period T1, the various attributes 350 of resource X are shown. As previously described, various attributes associated with resource X are retrieved from one or more data stores of the SDI 108A. Each field of the attribute is evaluated for the value type and a model is created. For example, the NI model 352 is shown, with field name 354 and corresponding leaf value type 356. In this example, the NI model is shown in a table form, with each row of the table corresponding to a field name and corresponding value type.

As an example, referring to row 358, the field "vpcid" has a value type of "String", as the value of "vpcid" is "vpc-abc123". And, in row 360, field "monitored" has a value type "Boolean", as the value of "monitored" at time period T1 is "true". In row 362, the value type for field "groupName" is "UNKNOWN" at this time, as the value for "groupName" is "null". Similarly, in row 364, the value type for field "ipPermissions[*]" is "UNKNOWN" at this time, as the value for "ipPermissions" is known to be an empty array, with no associated data. Note that the field representing "ipPermissions" is normalized to a generic array path, indicated by the wildcard [*]. In summary, the NI model 352 as shown is representative of the resource X, at time period T1, with a few fields with defined value types and a few fields with "UNKNOWN" value type.

Now, referring to FIG. 3C, various attributes 350 for resource X, for a time period T2 and corresponding model 352 is shown. We notice that additional rows have been added to the model 350, based on detecting additional fields and their corresponding values. For example, referring to row 366, a new field name "description" has been added with a value type "String". Also, we notice that some of the previously unknown value types have been updated with a value type. For example, referring to row 368, we notice that value type for field "groupName" has been updated as a "String", based on a value of "local network" for the field "groupName".

As one skilled in the art appreciates, the model 352 shown in FIG. 3C can have more fields added to the model, along with corresponding value types. However, there are still some fields that are unknown, for example, as shown in row 370. This process of reviewing the attributes of the resource X over a period of time and updating the model, based on additional information will eventually lead to the NI model 352 shown in FIG. 3D, with all of the fields and their corresponding value types identified. At this time, the NI model 352 is considered to be complete.

As previously described, the information retrieval engine 334 generates one or more path documents in the retrieval system, for each of the resources. In one example, each path document may refer to data contained in a row of the NI model created by the model builder, with additional information fields. In one example, an address to a document may be indexed for easy access. Each path document in the retrieval system contains a unique path and all of its associated information such as cloud type, resource name, service name, set of applicable operators and suggested values. The cloud type, resource name and service name are derived from the mappings provided in the database schemas. The applicable operators are extracted from the normalized paths and the type of value stored against that path. Example path document created by the information retrieval engine for path "vpcid" is shown in FIG. 3E.

Referring to FIG. 3E, an example path document 372 created for row 358 of model 352 shown in FIG. 3E. The path document 372 includes path (in this case, "vpcid") and type (in this case, "string", along with additional information fields like cloud type, service type, resource name and API name for the resource X.

As previously described, the rule authoring system 336 is configured to provide context sensitive help to a user, when a rule is being formed by a user. The rule authoring system 336 works in conjunction with the rule compiler 338 to provide context sensitive help to a user. In general, a rule follows one of these formats. One example format is <path> <operator> <operand>. An example of a rule according to this format is 'path contains "foo"'. Another example of a rule according to this format is 'path[*] size>0'. Another example format is <path> <operator cum operand>. An example of a rule according to this format is 'path is true'. Another example of a rule according to this format is 'path[*] exists'. Now, an example context sensitive help provided to a user, based on the model 352 shown in FIG. 3D is described.

Referring back to the model 352 shown in FIG. 3D, top level paths that a user may want to choose is first presented, without exposing lower level details. Based on the model 352 shown in FIG. 3D, top level paths are "groupid", "description", "ownerid", "vpcid", "tags[*]", "ipPermissions[*]","ipPermissionsEgress[*]" and "groupName". Once a list of paths is presented to the user, the next level of recommendation depends on the path chosen by the user to build a conditional. If the path selected is already complete, pointing to a leaf node in the tree representing the data, the rule authoring system 336 would present only applicable operators. On the other hand, if the selected path is an entry to a subtree (out degree more than 1), then the system would present a set of path extensions as well as operators applicable at the intermediate node. An example path-operator recommendation table 374 for model 352 is shown in FIG. 3F.

Referring to FIG. 3E, table 374, column 376 shows path chosen, column 378 shows leaf value type and column 380 shows sample recommendations, based on the leaf value type. For example, row 382 shows singular field like, "description". And, row 384 shows partial path leading to multiple leaves, for example, fields like "tags[*]". As one skilled in the art appreciates, an operand recommendation will be based on the type of leaf value. For example, if the leaf value is boolean, one of "true" or "false" is presented as an option to choose.

As the rule construction progresses, the existing string received from the query editor is sent to the rule complier 338. If a rule is incomplete, the rule compiler 338 returns possible completion scenarios back to the rule authoring system 336, which is presented to the user. A visual rule completion indicator may be presented to the user during the rule construction process. If the rule compiler 338 concludes that a rule is complete, the visual indicator may change a state to indicate completion. For example, a "X" mark may be displayed to the user when the rule is not complete and a "√" mark may be displayed when the rule is complete. Further, one or more colors may be used to further accentuate the rule completion indicator. Rule is considered complete when all the conditionals satisfy the underlying grammar. As one skilled in the art appreciates, the rule may be extended with additional conditionals beyond the completed state until next state of completion is reached.

In one example, the rule evaluation engine 340 retrieves the rules stored in the rules data store and based on the rule attributes, retrieves corresponding data from the SDI 108A. In one example, the rule evaluation engine 340 minimizes the data needed for matching the rule attributes, by using a pattern defined by the antecedents contained in the rule. For example, only fields and paths matching the pattern are saved as a minimized version of the retrieved data, in the mindata data store 344.

Figure 3G:
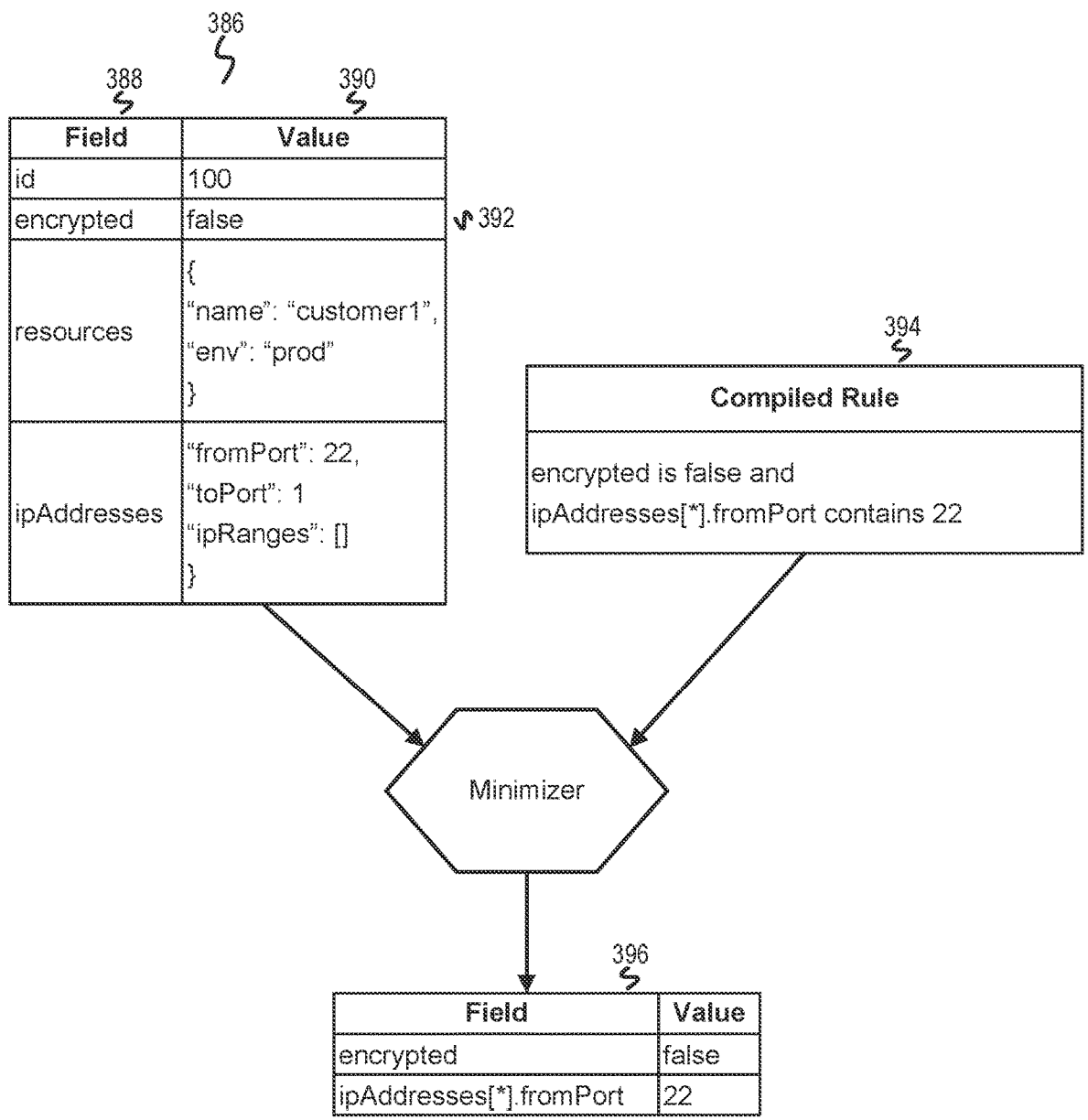
FIG. 3G shows an example minimization of data retrieved for a resource, according to an example of this disclosure.

Referring to FIG. 3G, an example minimization of data retrieved from the SDI for a resource is described. Table 386 shows retrieved data from the SDI, with column 388 showing field and column 390 showing corresponding value. For example, referring to row 392, field "encrypted" is "false". Compiled rule is shown in table 394. The rule evaluation engine 340 reviews the retrieved data shown in table 386 against the compiled rule shown in table 394. Based on the review of the rule, only two fields are relevant, namely "encrypted" and "ipAddresses[*]. from port". The rule evaluation engine 340 only retains rows corresponding to these two fields and stores an updated table 396 in the mindata data store 344.

The rule evaluation engine 340 further uses an ordering of conditions in a constructed rule, based on the type of condition. Conditions that do not contain an operand, such as boolean or field existence checks are promoted or ordered to be in the front of the rule. Following this ordering, leaf level checks are added and finally, operators that deal with intermediate nodes in the tree, requiring computation of all decedents, is added at the end of the rule. One of the benefits of such an ordering of conditions is to enable a fast fail, stop computing as soon as a boolean predicate is no longer true, instead of computing all the conditions. As one skilled in the art appreciates, a substantial amount of time may be spent on evaluating predicates that involve intermediate nodes in the tree, due to the need for navigating to the leaves and checking the rules. Rule 394 shown in FIG. 3G is an example rule that has been ordered. For example, "encrypted is false" precedes "ipAddresses[*]. fromPort" in the rule.

In one example, using the minimized data stored in the mindata datastore 344, an inverted map between the minimized data and the ID of the data indicative of the primary key for retrieval of data from one or more databases of the SDI 108A is created. This inverted map will, in some examples, eliminate redundant computation across duplicates, which may enable scaling and performance. The resulting inverted map is then evaluated against the rule filter.

Figure 3H:
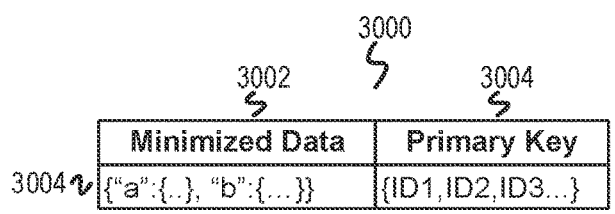
FIG. 3H shows an example inverted map table, according to an example of this disclosure.
Figure 31:
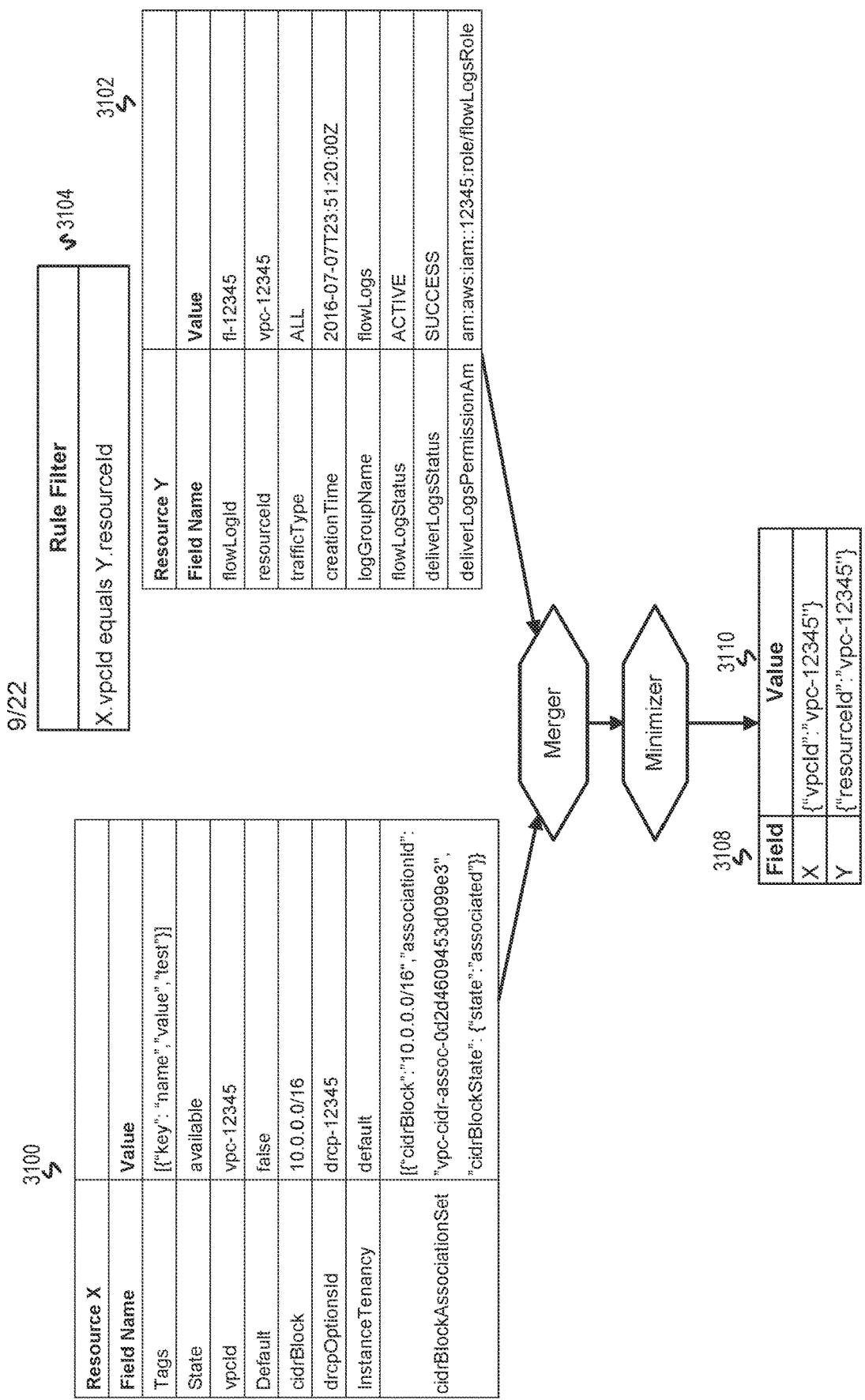

FIG. 3H shows an example inverted map table 3000. Column 3002 shows the minimized data and column 3004 shows primary key IDs that correspond to the minimized data. Now, referring to row 3006, data corresponding to column 3002 shows minimized data field of "a" and "b" with their corresponding values. Further, data corresponding to column 3004 shows primary key IDs of ID1, ID2 and ID3. As previously described, ID1, ID2 and ID3 correspond to the primary keys associated with documents containing data field of "a" and "b", with their corresponding values.

Now referring back to the table 396 shown in FIG. 3G, in one example, data field "a" may correspond to "encrypted" and corresponding value for field "a" may correspond to "false". Similarly, data field "b" may correspond to "ipAddresses[*]. from port" and corresponding value for field "b" may correspond to "22".

Join Across Multiple Resources:

In some examples, it may be beneficial to apply rules with variables that may be applicable to more than one resource. Rule evaluation engine 340 may be configured to perform this function. Example implementation will be described with reference to FIG. 3I. In this example, there are two resources, resource X and resource Y. Table 3100 shows data retrieved from the SDI for resource X. Table 3102 shows data retrieved from the SDI for resource Y. Table 3104 shows the rule to be applied across resource X and resource Y. For example, the rule to be applied is X.vpcid equals Y.resourceID. First, the rows of data in table 3100 and 3102 are merged by a merger engine executed in the rule evaluation engine 340. Then, the minimizer engine executed in the rule evaluation engine 340 generates a minimized data of the merged data, by retaining only fields and corresponding values that are applicable to the rule 3104. The generated minimized data is shown in table 3106, where column 3108 shows the field and column 3110 shows the corresponding value. The minimized data is stored in the mindata data store 344 by the rule evaluation engine 340.

Dependency Directed Updates:

In one example, the rule evaluation engine 340 receives any updates to the data corresponding to a resource of the SDI. The update(s) to the resource is evaluated to determine if it is an addition, deletion or modification of a field. The fields that are updated are checked against the data stored in the mindata data store. If the mindata data store does not have a corresponding field, the update is ignored, as no rule currently present is using that field. If on the other hand, the mindata data store does have a corresponding field, the value for the field is updated. In one example, rules that use the updated field are checked for compliance, based on the updated value and an alert is generated if the rule requires generation of an alert.

For example, referring back to FIG. 3H and inverted map table 3000, if the updates do not contain any changes to fields "a" and "b", those changes are ignored. If on the other hand, if there is a change to one or more of fields "a" or "b", corresponding primary keys ID1, ID2 and ID3 are used to retrieve associated documents and checked against corresponding rules for compliance, based on the changed value of "a" and/or "b" as applicable. Based on the compliance check, if there is a violation, appropriate alerts are generated.

Having described an example dynamic policy generation, example query to retrieve new or changes assets in a given period of time is described. Now, referring to FIG. 4, operation of an example query to retrieve new or changed assets in a given period of time is described. The query interface 314 of the DIQ engine 112 receives a query 402 as shown in FIG. 4. The query 402 is requesting the DIQ engine 112 to return any new or changed asset configurations for a given period of time, in this case from 2016-03-01T00:00:00Z to 2016-03-02T00:00:00Z. In other words, for a period of one day from Mar. 1, 2016. FIG. 4 also shows some of the asset data stored in the low latency data store 308, corresponding to this time period. As an example, the query interface 314 may issue one or more queries to the low latency data store 308 to retrieve corresponding stored data for the selected time period.

For example, table 404 shows an inventory table. The inventory table 404 in column 406 shows Id, column 408 shows type, column 410 shows first_seen and column 412 shows last_seen. Referring to row 414, asset type ACL with an Id of "1" was first_seen (or deployed) at 2016-01-01T00:00:10Z and last_seen (or terminated) at 2016-03-01T23:30:00Z. Similarly, referring to row 416, an asset type "Host" with an ID of "3" was first_seen (or deployed) at 2016-03-01T09:00:33Z and last_seen (or terminated) at 2016-03-01T09:02:00Z.

Next, table 420 shows an ACL rules table. The ACL rules table 420 in column 422 shows acl_id, column 424 shows time and column 426 shows corresponding permission for the specified ACL. Referring to row 428, for acl_id of "1", at time 2016-01-01T00:00:10Z, the permission granted was "inbound TCP *:* to *:80". In other words, the ACL with an acl_id of "1" permitted access from any IP address (internal or external) to port 80 of any resource to which acl_id of "1" was assigned.

Now, referring to table 430, an ACL attachment table is shown. The ACL attachment table 430 in column 432 shows resource_id, column 434 shows time, and column 436 shows acl_id. Referring to row 438, we see that acl_id of "1" was attached to resource_id of "3" (which happens to be of the type "Host" based on inventory table 404) at time 2016-03-01T09:00:33Z. In other words, Host with an id of "3" is permitted to receive inbound traffic from any IP address to its port 80 (based on row 428 of ACL rules table 420).

Now, referring to table 440, an interface attachment table is shown. The interface attachment table 440 in column 442 shows interface_id, column 444 shows time, column 446 shows attached_to and column 448 shows Ip. Now, referring to row 450 of table 440 and inventory table 404, we notice that interface_id of "2" was attached to host "3" with Ip addresses of 10.10.0.21 and 93.184.216.34.

Now, referring to table 452, an asset properties table is shown. The asset properties table 452 in column 454 shows Id, in column 456 shows time, in column 458 shows tag_key and in column 460 shows tag_value. Now, referring to row 462, we notice that Id of "3" at time 2016:03-01T09:02:00Z had a tag_key of Id=1-1001. From inventory table 404, we know that Id of "3" corresponds to the "Host". Referring to row 464, we notice that Id of "3" ("Host") at time 2016-03-01T09:02:00Z had for a tag_key of "name"="autotest-host". Now, referring to row 466, we notice that Id of "3" (host) at time 2016-03-01T09:02:00:00Z had for a tag_key of "env"="Production_web".

The query interface 314, based on the query 402 and associated data in the inventory table 404, ACL rules table 420, ACL attachment table 430 and interface attachment table 440 returns a result as shown in result 470. In other words, the result 470 indicates that Id of "3" (host) at time 2016-03-01T09:02:00Z had an interface Id of "2", with an ACL Id of "1".

In one example, the result 470 of the query 402 may be used to scan for possible compliance violation. This is described with reference to FIG. 5. Referring to FIG. 5, a policy table 500 is shown. The policy table 500 in column 502 shows rule_id, in column 504 shows asset type and in column 506 shows applicable rule. For example, referring to row 508, we see that rule_id of "1" applies to asset type of "Host" and the rule is "if asset.tag(env)!='production_web' then "No inbound network from internet".

In one example, the policy compliance table may be stored in the low latency data store 308. In one example, the policy compliance table may be stored in the SDI and retrieved by the security appliance 112. The result 470 is fed to the policy compliance engine 116, as described with reference to FIG. 2. The policy compliance engine 116 retrieves the applicable rule information for the asset type identified in the result from the policy compliance table 500. The policy compliance engine 116 analyzes the data contained in the inventory table 404, ACL rules table 420, ACL attachment table 430, interface attachment table 430 and asset properties table 452 as against the rule applicable to the asset type "host". As previously described with reference to FIG. 4, and more specifically, row 466 of Asset properties table 452, policy compliance engine 116 determines that the host with an Id of 3 and a tag_key of "env" has a tag_value of "Production_web". So, the rule identified in row 508 of the policy table 500 is applicable to host with an Id of 3. Further, based on the result 470, the policy compliance engine 116 checks the applicable ACL rules, in this case, for an ACL Id of "1". Based on the review of the ACL rules table 420 for an ACL Id of 1, any inbound TCP traffic is permitted, as previously described with reference to FIG. 4. This ACL permission is not permitted per policy rule identified in row 508 of the policy table 500. Therefore, the policy compliance engine 116 concludes that there was a violation of policy rules during the deployment of host with a host ID of "3". The policy compliance engine 116 generates a violation report detailing the violation to the notification engine 120. The notification engine 120 sends an appropriate message to the user informing the violation. An example violation report 510 sent by the notification engine 120 is now described.

The violation report 510 may include one or more components. In one example, the violation report 510 may include a message 512, a network query 514 and an event query 516. In this example, the message 512 includes a human readable text as shown in block 518. The network query 516 in this example, will be presented as a hyperlink, which when activated, submits a customized query to the query interface 314 of the DIQ engine 112, to retrieve all related network flow. In this example, the network query is shown in block 520. The event query 516 in this example, will be presented as a hyperlink, which when activated, submits a customized query to the query interface 314 of the DIQ engine 112, to retrieve all applicable audit events associated with assets in question reported by the SDI during the applicable time period. In this example, the event query is shown in block 522.

As part of processing queries provided by users or external processes and correctly addressing various data sources, the query interface 314 has to understand relationships between different data types and different asset types. In some examples, these relationships may be static relationships and expressed as static relationship rules. In some examples, these relationships may be dynamic relationships and expressed as dynamic relationship rules or inferred relationship rules. An example of context stitching by the security appliance 110 of this disclosure with static relationship rules will be described with reference to FIG. 6.

Figures 2, 6:
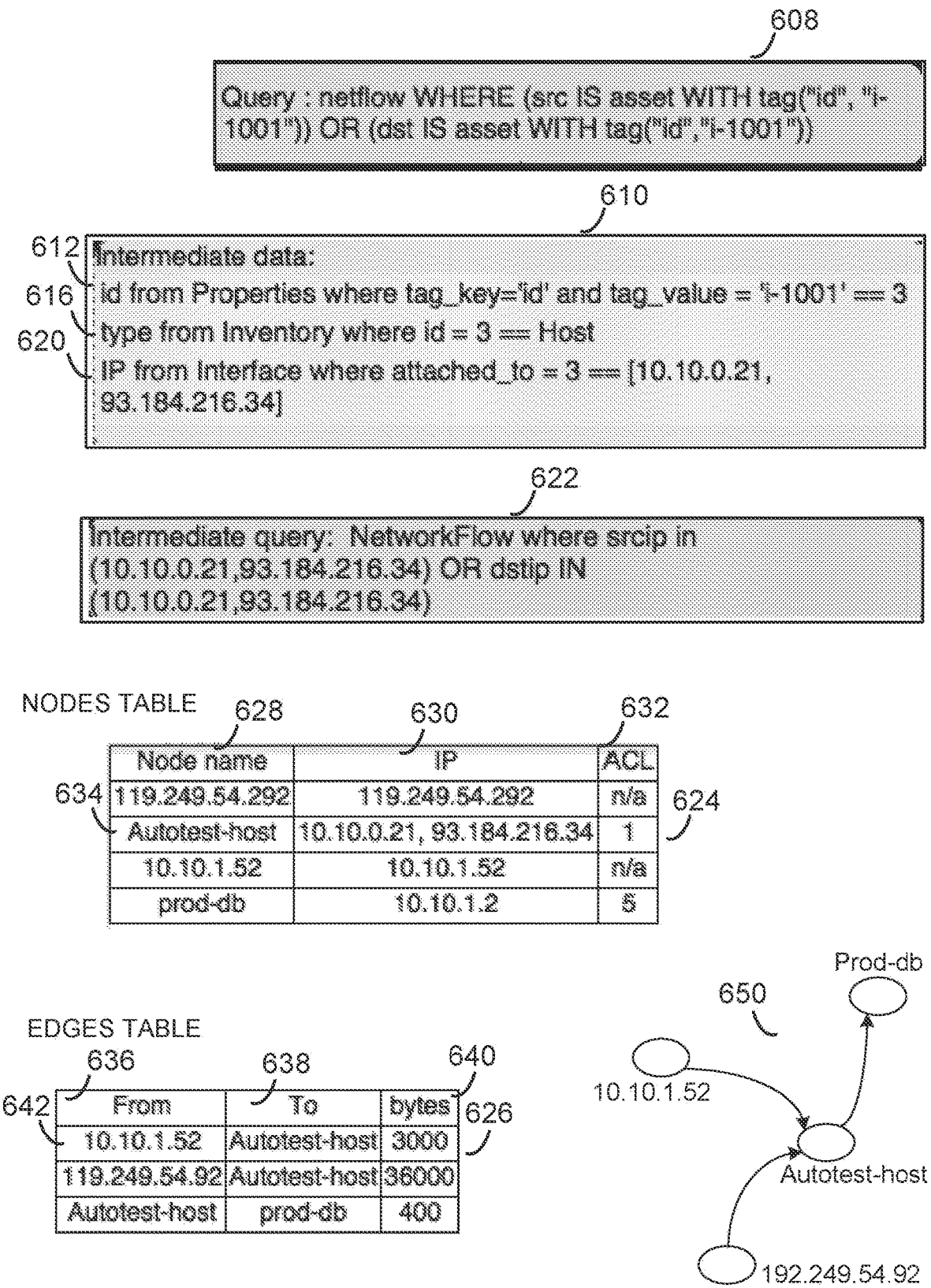

Referring to FIGS. 6-1 and 6-2, an example processing of a high level query using static relationship rules will now be explained. FIG. 6-1 shows various tables stored in the data stores of the DIQ engine 112. For example, table 404-1 shows an inventory table. Inventory table 404-1 is similar to inventory table 404, previously described with reference to FIG. 4. Table 420-1 shows an ACL rules table. ACL rules table 420-1 is similar to ACL rules table 420, previously described with reference to FIG. 4. Table 430-1 shows an ACL attachment table. ACL attachment table 430-1 is similar to ACL attachment table 430 described with reference to FIG. 4. Table 440-1 shows an interface attachment table. Interface attachment table 440-1 is similar to Interface attachment table 440, previously described with reference to FIG. 4. Table 452-1 shows an asset properties table. Asset properties table 452-1 is similar to asset properties table 452 previously described with reference to FIG. 4.

Table 602 shows an example static relationship table 602. Each of the rows of static relationship table 602 articulates one of the static relationship rules which can be read and understood by the query interface 314. For example, referring to row 604, one of the rules is "Host has an Interface where Interface.attached_to=Host.id". Now, referring to row 606 of interface attachment table 440-1, we see that interface_id of "2" is attached_to "3". Here, based on the rule defined in row 604 of the static relationship table 602, the number "3" refers to a "host.id".

Similarly, referring to row 608 of the static relationship table 602, the rule is "Interface has an IP attachment". So, referring back to row 606 of interface attachment table 440-1, we see that "interface_id" of "2" has IP attachment to IP addresses 10.10.0.21 and 93.184.216.34.

Table 472 shows an example network flow table. Network flow table 472 in column 474 shows time, column 476 shows protocol (proto), column 478 shows source IP address (srcip), column 480 shows destination IP address (dstip), column 482 shows destination port (dstport) and column 484 shows number of bytes transferred (bytes). Now, referring to row 486 of network flow table 472, we notice that at time 2016-03-01-T09:01:10Z, using "tcp" protocol, an asset with a source IP address of 10.10.1.52 sent 3000 bytes of data to port "80" of another asset with a destination IP address of 10.10.0.21.

Now, referring to FIG. 6-2, an example processing of a high level query using static relationship rules will now be explained. An example query 608 is received by the query interface 314 from a user or an external process. Query 608 is directed to retrieve network flow from a specific asset with an asset ID of "1-1001", where the asset is either a source or a destination. In order to process the query 608, the query interface 314 retrieves some relevant intermediate data, as shown in block 610. For example, the query interface 314 issues one or more queries to retrieve intermediate data. For example, referring to row 612 of block 610, the query interface 314 first retrieves ID value from the asset property table 430-1, based on a tag_value of "1-1001" for the tag_key-"id". Row 614 of the asset property table 430-1 matches this request and the corresponding ID value is 3.

Next, referring to row 616 of block 610, the query interface 314 next retrieves the "type" for "id=3" from the inventory table 404-1, which corresponds to data in row 618 of inventory table 404-1. Based on the data in row 618 of inventory table 404-1, the "type" for "id=3" is a "Host".

Next, referring to row 620 of block 610, the query interface 314 next retrieves the IP addresses from interface attachment table 440-1, where "attached_to" value is equal to "3". This corresponds to row 606 of interface attachment table 440-1. Based on the data in row 606 of interface attachment table 440-1, the IP addresses are 10.10.0.21 and 93.184.216.34.

Now, referring to block 622, another query is issued by the query interface 314 to the network flow table 472, to retrieve all network flow data where source IP address is 10.10.0.21 or 93.184.216.34 or destination IP address is 10.10.0.21 or 93.184.216.34. We notice that rows 486, 488 and 490 of network flow table 472 has entries corresponding to IP addresses 10.10.0.21 and 93.184.216.34. Corresponding information is received as a response to the issued query.

In one example, the query interface 314 consolidates the received information in a table form. For example, the query interface 314 constructs a nodes table 624 and an edges table 626 using interrelated data from various data sources of the AIQ engine 112. The nodes table 624 in column 628 shows node name, in column 630 shows IP address and in column 632 shows ACL used. For example, referring to row 634 of nodes table 624, we notice that a node name of "Autotest-host" was assigned to IP addresses 10.10.0.21 and 93.184.216.34, with an assigned ACL of 1. As previously described, the host with a host ID of 3 was assigned IP addresses 10.10.0.21 and 93.184.216.34. Further, based on the asset properties table 452-1, host with an id of "3" had a "name" of "autotest-host". Further, host with an "id" of 3 had acl_id of 1 assigned per ACL attachment table 430-1.

The edges table 626 in column 636 shows network flow from a node (From), column 638 shows network flow to a node (To) and column 638 shows number of bytes (bytes) transferred. For example, referring to row 624, we notice that node 10.10.1.52 transferred 3000 bytes of data to node "Autotest-host".

In some examples, information stored in the nodes table 624 and edges table 626 may be represented as a table on a display device of a user computer. In some examples, information stored in the nodes table 624 and edges table 626 may be sent to the visualization engine 118, which may communicate with the rendering engine 132 to present the retrieved results in a graphical form. An example graph 650 displayed on a display device of the user computer is shown. In one example, the graph 650 may be a directed graph, showing the node name from the node table 624, with directional lines connecting the nodes based on information from the edges table 626. The directional lines represent the edges between the nodes. In one example, when a user hovers over a node, additional information related to the node may be displayed by a popup screen. For example, additional information stored in the nodes table 624 may be displayed. Information like the IP address and applicable ACL may be displayed. In one example, when a user hovers over a directional line connecting two nodes, additional information related to the edges may be displayed by a popup screen. For example, additional information stored in the edges table 624 may be displayed. Information like number of bytes transferred may be displayed.

In some examples, a dynamic (or inferred) relationship rules table may be created, based on observed events by the security appliance 110. For example, a lead event, say an audit event may be succeeded by one or more additional events, for example, one or more audit events. The security appliance 110, in some examples, the machine learning engine 114 of the security appliance 110 may evaluate a plurality of events and come up with one or more inferred relationships. Referring to FIGS. 7-1 and 7-2 an example query processed by the query interface 314 using inferred relationship rules.

Referring to FIG. 7-1, various tables stored in the data stores of the DIQ engine 112 is shown. For example, table 404-2 shows an inventory table. Inventory table 404-2 is similar to inventory table 404, previously described with reference to FIG. 4. Table 702 shows a roles table. Roles table 702 in column 704 shows "Id" of a user or a process and in column 706 shows permission granted to the user or process (permission). For example, referring to row 708 of roles table 702, user "Alice" is granted permission to "ListAssets, CreateHost, DeleteHost and EditAcl". Table 710 shows an owners table. Owners table 710 in column 712 shows "resource_id", in column 714 shows "time" and in column 716 shows "owner_id". For example, referring to row 718 of owners table 710, we notice that resource_id of "3" at time 2016-03-01T09:00:33Z had an owner_id of "AutoTestScript".

Table 720 shows an audit event table. Audit event table 720 in column 722 shows "id", in column 724 shows "time", in column 726 shows "subject", in column 728 shows "action" and in column 730 shows "object". For example, referring to row 731 of audit event table 720, we notice for "id" of "1", at time 2016-03-01T09:00:33Z, subject was "AutoTestScript", action was "CreateHost" and Object was "3".

Table 732 shows an inferred relationship rules table. Inferred relationship rules table 732 shows inferred relationships based on evaluation of various events over time. For example, referring to row 734 of inferred relationship rules table 732, we notice that "CreateHost" action is followed within 30 seconds by "AttachInterface" action with Subject=Root and AttachInterface. Objects contains CreateHost.Objects. Similarly, referring to row 736 of inferred relationship rules table 732, we notice that "CreateHost" action is followed within 30 seconds by "AssignIP" with Subject=Root and prior AttachInterface.Objects contains CreateHost.Objects and AttachInterface.Objects contains "AssignIp.Objects." These rules further assist the query interface 314 of the DIQ engine 112 to appropriately interpret a series of audit events and determine applicable assets related to the audit events. As an example, referring to audit events table 720, we notice that action in event id of "1" is a "CreateHost". Based on rule shown in row 734 of inferred relationship rules table 732, event id of "2" is related to event id of "1" in the audit events table 720. And, based on the rule shown in row 736 of inferred relationship rules table 732, event id of "4" is related to event id of "1" in the audit events table 720.

Now, referring to FIG. 7-2, an example query processed by the query interface 314 using various tables described in FIG. 7-1 will be explained. An example query received by the query interface 314 is shown in block 738. The query is to retrieve all audit events where object is "asset" with an "id" of 3 between a time period of 2016-03-01T09:00.33Z and 2016-03:01T09:12.00Z. Block 740 shows relationships between event 1 and event 2 and event 1 and event 3 of the audit events table 720, based on the rules of the inferred relationship rules table 732, as previously described.

Table 742 shows the audit events results of the query, showing selective events satisfying the query request. For example, column 744 shows time, column 746 shows "subject", column 748 shows "action" and column 750 shows "detail". As an example, referring to row 752 of the audit events results table 742, we notice that at time "2016-03-01T09:00:33Z, "AutoTestScript" process executed an action "CreateHost". In this example, the query interface 314 has further retrieved details of the action, from other tables of the DIQ engine, which is shown in the details column. For example, the asset properties table as previously described may be used to provide further details. For example, a host ID of "1-1001" was assigned in this audit event.

As one skilled in the art appreciates, ACLs allow input traffic to an asset. In some examples, it may be beneficial to know which ACLs are used and which ACLs are not used in a given time frame, by an asset. A dormant ACL may pose potential risk to an enterprise. By knowing the usage of the ACLs by an asset, one or more ACLs not used may be retired or deleted. Referring to FIG. 8-1 and FIG. 8-2, determination of usage of ACLs and identification of dormant ACLs is explained.

Referring to FIG. 8-1, various tables stored in the data stores of the DIQ engine 112 is shown. For example, table 404-3 shows an inventory table. Inventory table 404-3 is similar to inventory table 404, previously described with reference to FIG. 4. Table 420-2 shows an ACL rules table. ACL rules table 420-2 is similar to ACL rules table 420, previously described with reference to FIG. 4. Table 430-2 shows an ACL attachment table. ACL attachment table 430-2 is similar to ACL attachment table 430, previously described with reference to FIG. 4. Table 440-2 shows interface attachment table. Interface attachment table 440-2 is similar to interface attachment table 440, previously described with reference to FIG. 4. Table 452-2 shows an asset properties table. Asset properties table 452-2 is similar to asset property table 452, previously described with reference to FIG. 4. Table 472-1 shows a network flow table. Network flow table 472-1 is similar to network flow table 472, previously described with reference to FIG. 4.

Now, referring to FIG. 8-2, an example query processed by the query interface 314 using various tables described in FIG. 8-1 will be explained. An example query received by the query interface 314 is shown in block 802. The query is to retrieve ACLs used by network traffic where source or destination is "1-1001" and time between 2016-03-01-T09:00:00Z and 2016-03-01-T09:13:00Z.

The query interface 314 retrieves intermediate data, by using a query shown in block 804. Intermediate data is IP related to asset with tag("id")="1-1001". As previously described with reference to block 610 of FIG. 6-2, using the tables shown in FIG. 8-1, the query interface 314 determines that IP addresses related to asset with tag("di")="1-1001" are 10.10.0.21 and 93.184.216.34.

Having determined applicable IP addresses for the requested query, another query is initiated by the query interface 314, as shown in block 806, to retrieve network traffic where source IP address or destination IP address is either 10.10.0.21 or 93.184.216.34, during a time period between 2016-03-01-T09:00:00Z and 2016-03-01-T09:13:00Z. Query as shown in block 806 retrieves matching records from network flow table 472-1, as shown in network results table 808.

Having retrieved the matching records as shown in table 808, the query interface 314 now issues another query as shown in block 810. The query shown in block 810 reviews each row of the network results table 808 to evaluate each ACL attached to asset attached to an interface with IP address contained in the destination IP of the flow. The query will tag ACLs which would allow this flow. Results of this query is shown in ACL results table 812. The ACL results table 812 has column 814 showing flow row number (flow row #) which corresponds to the row number of the network flow in network results table 808. For example, flow row # of 1 corresponds to network flow shown in row 816 of network results table 808. Column 818 of table 812 shows acl_id ad column 820 shows if the acl_id shown in column 818 would allow the flow identified in the corresponding flow row #.

Now, referring to row 822 of ACL results table 812, we notice that this corresponds to flow row #1 (shown in row 816 of network results table 808), with a destination IP address of 10.10.0.21 and destination port of 80. Based on the interface attachment table 440-2, row 824, resource ID of "3" has an IP address of 10.10.0.21. And, based on the ACL attachment table 430-2, resource ID of "3" has ACL_id of "1" assigned to it. Further, based on ACL rules table 420-2, ACL_id of "1" would permit inbound network flow to port 80. Therefore, in ACL results table 812, in row 822, for "would_allow" column, a value of "true" is assigned.

Now, referring to row 830 of ACL results table, we notice that for a resource id="3" corresponding acl_id of "7" is assigned (based on row 830 of ACL attachment table 430-2). From row 832 of ACL rules table 420-2, we notice that acl_id of "7" permits inbound traffic to port 22. However, network flow in flow row #1 (row 816 of network results table 808) is to port 80. Therefore, in ACL results table 812, in row 830, for "would_allow" column, a value of "false" is assigned. Similarly, the query interface 314 analyzes all the network flows identified in the network results table 808 and generates corresponding rows of information in the ACL results table 812.

The query interface 314 analyzes each of the rows of the ACL results table 812 and returns acl_id corresponding to rows with "would_allow" column marked as "true" as final result to the query shown in block 802. In summary, the result to the query is shown in block 832. As one skilled in the art appreciates, reviewing the ACL results table 812 also indicates that acl_id of "7" is not used by any of the network flows. So, in some examples, this information may be used to delete the corresponding ACL from the ACL rules table 420-2.

Previously, with reference to FIG. 5, an example policy compliance violation was determined by the security appliance 110. In some examples, it may be beneficial to know if a compliance violation occurred in the past, due to a changed rule. This will be further explained with reference to FIG. 9-1 and FIG. 9-2.

Referring to FIG. 9-1, various tables stored in the data stores of the DIQ engine 112 is shown. For example, table 404-4 shows an inventory table. Inventory table 404-4 is similar to inventory table 404, previously described with reference to FIG. 4. Table 420-3 shows an ACL rules table. ACL rules table 420-3 is similar to ACL rules table 420, previously described with reference to FIG. 4. Table 430-3 shows an ACL attachment table. ACL attachment table 430-3 is similar to ACL attachment table 430, previously described with reference to FIG. 4. Table 440-3 shows interface attachment table. Interface attachment table 440-3 is similar to interface attachment table 440, previously described with reference to FIG. 4. Table 452-3 shows an asset properties table. Asset properties table 452-3 is similar to asset property table 452, previously described with reference to FIG. 4. Table 500-1 shows a policy table. Policy table 500-1 is similar to the policy table 500, previously described with reference to FIG. 5. Table 720-1 shows an audit event table. Audit event table 720-1 is similar to audit event table 720, previously described with reference to FIG. 7.

Now, referring to FIG. 9-2, an example query processed by the query interface 314 using various tables described in FIG. 9-1 will be explained. An example query received by the query interface 314 is shown in block 902. The query is to scan for new or changed asset configurations from time 2016-01-01-T00:00:00Z to 2016-03-01-T00:00:00Z. Time period in this example is longer than the time period in example described with reference to FIG. 5.

As previously described with reference to FIG. 4 and FIG. 5, as per the policy table 500-1, for asset type "Host", if asset.tag "env" is a "production_web", then, no inbound traffic from internet is permitted. Id of "3" corresponds to a "Host" per inventory table 404-4. Resource ID of "3" is attached to acl_id of "1" per ACL attachment table 430-3. Per ACL rules table 420-3, row 904, for acl_id of 1, inbound traffic is permitted from the internet to port 80. Therefore, Host with a host id of "3" is in violation of policy in policy table 500-1. This violation occurred between the times of 2016-02-10T080:00:00Z and 2016-02-12T09:20:00Z.

Based on the analysis described above, the query interface 314 generates a violation report as shown in block 906. The violation report shown in block 906 is similar to the violation report as shown in block 510 and described with reference to FIG. 5. The query interface 314 issues a query as shown in block 908, to retrieve applicable audit events, for the criteria identified in the violation report shown in block 906. As one skilled in the art appreciates, time window used in the event query may be adjusted (or extended) appropriately to capture all applicable events before and after the violation. Corresponding audit events are retrieved from the audit event table 720 and presented as audit event results table 910. Referring to audit event results table 910, we notice that user "Alice" made the changes to ACL rules.

As previously described, the machine learning engine 114 of the security appliance 110 periodically evaluates various events and generates rules and profiles for various assets and users. In one example, various audit events from DIQ engine 112 are evaluated by the machine learning engine 114 and generates a baseline for activities for a user. Generated baseline for activities for a user may be advantageously used to detect deviations from the norm, which may in some examples indicate an abnormal or malicious activity. This will be further described with reference to FIG. 10.

Now, referring to FIG. 10, an example user baseline table 1002 is shown. User baseline table 1002 in column 1004 shows user, in column 1006 shows feature and in column 1008 shows value. For example, referring to row 1010, user Alice generally logs-in using a pair of IP addresses shown in the "value" column. Referring to row 1012, we notice that Alice's geography for logs-in are from US. Referring to row 1014, Alice generally performs EditAcl action about 1.4 times a session and referring to row 1016, Alice generally performs CreateHost action about 0.2 times a session.

Table 720-2 shows an example audit event table. Audit event table 720-2 is similar to audit event table 720, previously described with reference to FIG. 7. However, in the audit event table 720-2, an additional column 1018 is shown. In column 1018, source IP responsible for the action is also shown.

In block 1020, the audit event stream is monitored by the security appliance 110. For example, the machine learning engine 114 of the security appliance 110 may monitor the audit event stream from the DIQ engine 112. The machine learning engine 114 compares the audit event stream (for example, as shown in rows of the audit event table 720-2 for any deviation from the profile described in the user baseline table 1002 for the specific user. If there are any excessive deviation in the profile described in the user baseline table 1002 for the specific user, for example, above a threshold value, the machine learning engine 114 triggers the generation of a violation report.

Based on the review of the audit events from the audit events table 720-2, the machine learning engine 114 determines that there is an excessive deviation from the baseline for Alice, as shown in block 1022. For example, reviewing the audit events table 720-2 row with ID of 5 we notice that Alice logged-in from a source IP that is different than those identified in the user baselines table 1002. Next, reviewing rows 6-10 of the audit events table 720-2, we notice that there were five "CreateHost" action by Alice within a short period of time, during a given session. This is inconsistent with Alice's baseline as shown in row 1016 of user baselines table 1002, which is about 0.2 per session. Further, in this example, the IP address of 155.133.82.159 indicates a geo location other than US.

Block 1024 shows an example violation report generated by the security appliance 110, to indicate the deviation from the baseline, for user Alice. The violation report shown in block 1024 is similar to violation report 510 described with reference to FIG. 5, for example, with a message portion, a network query portion and an event query portion.

Now, referring to FIG. 11, an example automated remedial action that may be taken by the remediation engine 122 of the security appliance 110 is described. As previously described with reference to FIG. 10, the machine learning engine 114 monitors the audit events for any deviation from the baseline. When a deviation is detected, as previously described, in one example, the machine learning engine 114 may issue a trigger to the remediation engine 122 and send the violation report as shown in block 1104 for further action.

In one example, a remediation configuration table 1102 may be provided in the security appliance 110. In one example, the remediation configuration table 1102 may be provided in the remediation engine 122. The remediation configuration table 1102 provides steps to be taken by the remediation engine 122, based on the reported violation. For example, column 1106 shows the violation (On violation), column 1108 shows remedy parameters and column 1110 shows remedy action. Referring to row 1112, we notice that for "abnormal console activity", remedy parameters are to determine the applicable assets and remedy action is to log-in to the applicable SDI and detach the currently attached ACL for the applicable asset and re-attach a new ACL to the applicable asset, where the asset is no longer accessible from the internet. In other words, ACL for the applicable asset is changed to quarantine the asset. The quarantined asset is investigated further for additional corrective action, as applicable. In block 1114, remedial action is performed, as defined in the applicable row of the remediation configuration table 1102.

Figure 12:
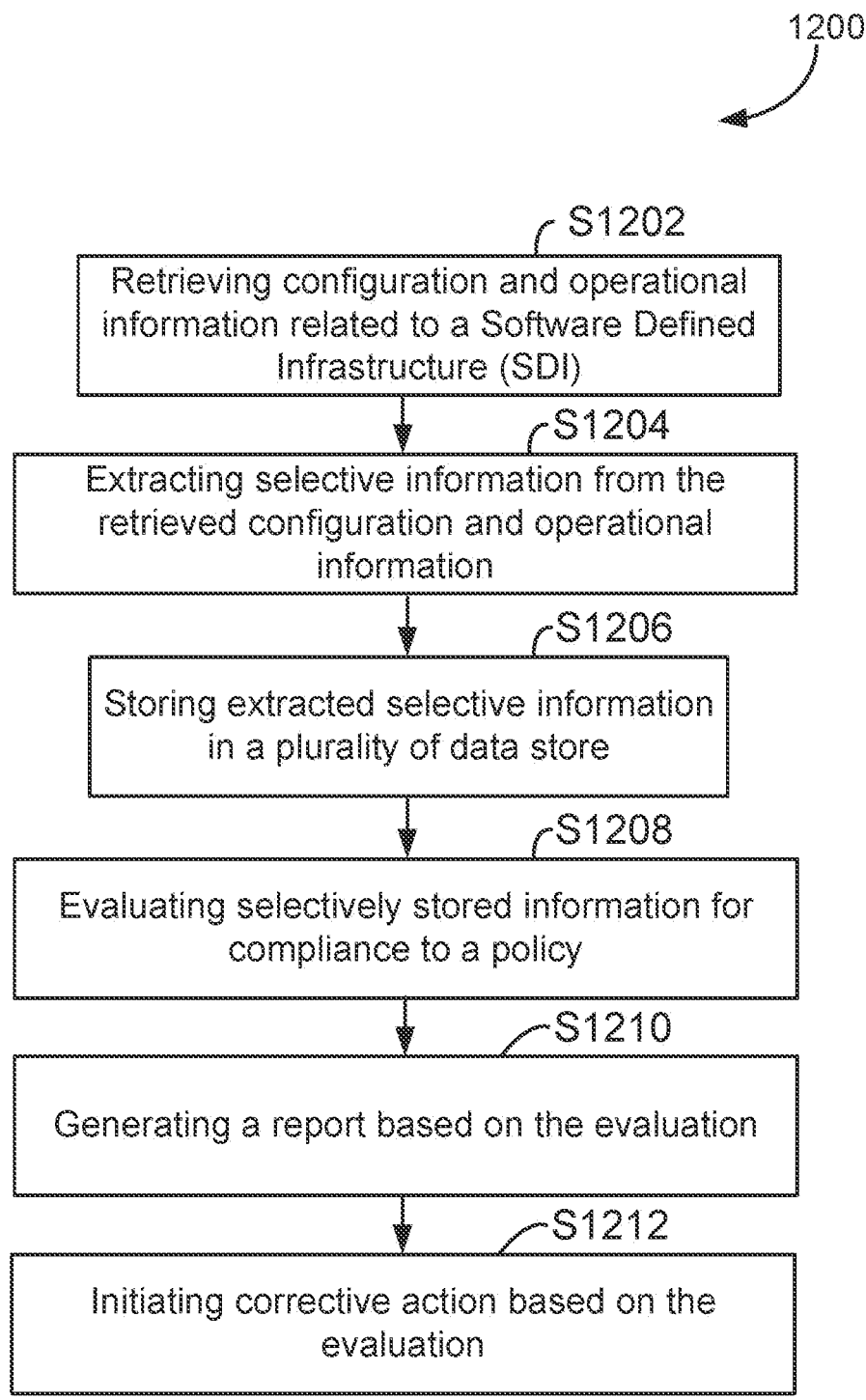
FIG. 12 shows an example flow diagram, according to an example of this disclosure.

Now, referring to FIG. 12, an example flow diagram 1200 is described. In block S1202, configuration and operational information related to a software defined infrastructure (SDI) is retrieved. For example, the security appliance 110 retrieves the configuration and operational information related to the SDI, for example, using a SDI API. In one example, the data ingestion and query engine 112 of the security appliance 110 retrieves the information from the SDI.

In block S1204, selective information is extracted from the retrieved configuration and operational information. For example, the security appliance selectively retrieves information related to asset configuration, audit events and network flow log information.

In block S1206, extracted selective information is stored in a plurality of data stores. For example, extracted selective information may be stored in a low latency data store 308, a bulk data store 310 and the aggregated network flow data store 312. In one example, the extracted selective information may be stored in a plurality of tables. For example, an inventory table 404, a ACL rules table 420, ACL attachment table 430, interface attachment table 440, asset properties table 452, policy table 500, static relationship rules table 602, network flow table 472, inferred relationship rules table 732, roles table 702, owners table 710, audit events table 720, and user baselines table 1002.

In block S1208, selectively stored information is evaluated for compliance to a policy. For example, compliance of an asset to an applicable policy as defined in the policy table 500 is evaluated, as described with reference to FIG. 5 and FIGS. 9-1 and 9-2.

In block S1210, a report is generated based on the evaluation. For example, a violation report may be generated, as described with reference to FIG. 5 and FIGS. 9-1 and 9-2.

In block S1212, a corrective action is initiated based on the evaluation. In one example, the violation report is sent to a user for further review and action. In some examples, the security appliance 110 may initiate a corrective action, for example, as described with reference to FIG. 10 and FIG. 11.

The embodiments disclosed herein can be implemented through at least one software program running on at least one hardware device and performing various functions of the security appliance. Various functions of the security appliance as described herein can be at least one of a hardware device, or a combination of hardware device and software module.

The hardware device can be any kind of device which can be programmed including e.g., any kind of computer like a server or a personal computer, or the like, or any combination thereof, e.g., one processor and two FPGAs. The device may also include means which could be e.g., hardware means like e.g., an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g., using a plurality of CPUs.

The principles of the dynamic policy generator are described with reference to the data stores of the SDI. However, principles of the query generator described with reference to the dynamic policy generator may be applied to any data stored in a tree structure and a corresponding NI model may be generated for the data stored in a tree structure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A method comprising:
    generating a baseline for each user indicated in a plurality of events based on monitoring events corresponding to a set of one or more software defined infrastructure, wherein the baseline for each user indicates a user identifier, one or more features for each action indicated in the plurality of events for the user, and a set of one or more values for each of the features at least one of which is a session aggregate of values of the corresponding one of the features;
    monitoring an event stream of a first user for deviation from the baseline of the first user,
        wherein the event stream indicates a series of actions corresponding to at least a first of the set of software defined infrastructure and, for each action, a user identifier, time, and source network address,
        wherein monitoring the event stream comprises comparing a subset of the actions in the event stream associated with a user identifier of the first user with the baseline of the first user to determine deviation from any one of the values of the features corresponding to the subset of actions; and
    based on detection of a first deviation, generating a violation report that identifies the first user and a first of the features corresponding to the first deviation.

2. The method of claim 1, wherein generating the baseline for the first user comprises evaluating audit events of the first user and recording, for each action indicated in the audit events, at least one of: source network address, action type, object, and geographic location of the source address.

3. The method of claim 1, wherein a session aggregate is one of an aggregate of values generating the baseline for the first user comprises determining the session aggregate of values of a first of the features, wherein the session aggregate comprises one of a number of actions per time interval within a session and an average of the values of the first feature within a session.

4. The method of claim 1 further comprising generating inferred relationship rules among actions indicated in audit events for network assets and users being monitored.

5. The method of claim 4, wherein generating the inferred relationship rules and the baselines is based, at least in part, on pattern mining the audit events.

6. The method of claim 4 further comprising generating an intermediate query from a scan query to scan for at least one of; new assets and asset configuration changes, wherein the intermediate query is generated based, at least in part, on the inferred relationship rules and the scan query, wherein results of the intermediate query and the scan query form part of the event stream.

7. The method of claim 1 further comprising detecting the first deviation, wherein the first deviation comprises at least one of: login from a source network address not indicated in the baseline of the first user, a number of actions per a time interval within a session that exceeds a threshold indicated in the baseline of the first user, and login from a geographic location not indicated in the baseline of the first user.

8. The method of claim 1 further comprising triggering a remediation action to adjust configuration of an asset created or modified by an action corresponding to the first deviation or to inject firewall rules to isolate an asset of the software defined infrastructure affected by the first deviation.

9. The method of claim 1 further comprising generating at least one of: an event query and a network query in response to detection of the first deviation,
    wherein generating the event query comprises generating a query for events that indicate the user identifier of the first user with a time constraint corresponding to the first deviation,
    wherein generating the network query comprises generating a query for netflow with a parameter that is a network address that deviates from the baseline of the first user.

10. A non-transitory, computer-readable medium having program code stored thereon, the program code comprising instructions to:
    generate a baseline for each user indicated in a plurality of events based on monitoring events corresponding to a set of one or more software defined infrastructure, wherein the baseline for each user indicates a user identifier, one or more features for each action indicated in the plurality of events for the user, and a set of one or more values for each of the features at least one of which is a session aggregate of values of the corresponding one of the features;
    monitor an event stream of a first user for deviations from the baseline of the first user,
        wherein the event stream indicates a series of actions corresponding to at least a first of the set of software defined infrastructure and, for each action, a user identifier, time, and source network address, wherein the instructions to monitor the event stream comprise instructions to compare a subset of the actions in the event stream associated with a user identifier of the first user with the baseline of the first user to determine deviation from any one of the values of the features corresponding to the subset of actions; and based on detection of a first deviation, generate a violation report that identifies the first user and a first of the features corresponding to the first deviation.

11. The non-transitory, computer-readable medium of claim 10, wherein the instructions to generate the baseline for the first user comprise instructions to evaluate audit events of the first user and record, for each action indicated in the audit events, at least one of: source network address, action type, object, and geographic location of the source address.

12. The non-transitory, computer-readable medium of claim 10, wherein the instructions to generate the baseline for the first user comprise instructions to determine the session aggregate of values of a first of the features, wherein the session aggregate is one of a number of actions per time interval within a session and an average of the values of the first feature within a session.

13. The non-transitory, computer-readable medium of claim 10, wherein the program code further comprises instructions to generate inferred relationship rules among actions indicated in audit events for network assets and users being monitored.

14. The non-transitory, computer-readable medium of claim 13, wherein the instructions to generate the inferred relationship rules and the baselines comprise the instructions to perform pattern mining on the audit events to infer relationships among actions indicated in the audit events and to generate the inferred relationship rules accordingly.

15. The non-transitory, computer-readable medium of claim 13, wherein the program code further comprises instructions to generate an intermediate query from a scan query to scan for at least one of: new assets and asset configuration changes, wherein the intermediate query is generated based, at least in part, on the inferred relationship rules and the scan query, wherein results of the intermediate query and the scan query form part of the event stream.

16. The non-transitory, computer-readable medium of claim 10, wherein the program code further comprises instructions to detect the first deviation, wherein the first deviation comprises at least one of: login from a source network address not indicated in the baseline of the first user, a number of actions per a time interval within a session that exceeds a threshold indicated in the baseline of the first user, and login from a geographic location not indicated in the baseline of the first user.

17. The non-transitory, computer-readable medium of claim 10, wherein the program code further comprises instructions to trigger a remediation action to adjust configuration of an asset created or modified by an action corresponding to the first deviation or to inject firewall rules to isolate an asset of the software defined infrastructure affected by the first deviation.

18. The non-transitory, computer-readable medium of claim 10, wherein the program code further comprises instructions to generate at least one of: an event query and a network query in response to detection of the first deviation, wherein the instructions to generate the event query comprise instructions to generate a query for events that indicate the user identifier of the first user with a time constraint corresponding to the first deviation, wherein the instructions to generate the network query comprise instructions to generate a query for netflow with a parameter that is a network address that deviates from the baseline of the first user.

19. An apparatus comprising:
a processor; and
a computer-readable medium having instructions stored thereon that are executable by the processor to cause the apparatus to, generate a baseline for each user indicated in a plurality of events based on monitoring events corresponding to a set of one or more software defined infrastructure, wherein the baseline for each user indicates a user identifier, a set of one or more features for each action indicated in the plurality of events for the user, and a set of one or more values for each of the features at least one of which is a session aggregate of values of the corresponding one of the features;

monitor an event stream of a first user for deviation from the baseline of the first user, wherein the event stream indicates a series of actions corresponding to at least a first of the set of software defined infrastructure and, for each action, a user identifier, time, and source network address, wherein the instructions to monitor the event stream comprise instructions to compare a subset of the actions in the event stream associated with a user identifier of the first user with the baseline of the first user to determine deviation from any one of the values of the features corresponding to the subset of actions; and based on detection of a first deviation, generate a violation report that identifies the first user and the one of the features corresponding to the first deviation.

20. The apparatus of claim 19, wherein the computer-readable medium further has stored thereon instructions executable by the processor to cause the apparatus to:

pattern mine actions and objects indicated in audit events for network assets of the software defined infrastructure;

generate rules according to relationships among the actions inferred based on pattern mining the actions and objects; and generate an intermediate query from a scan query to scan for at least one of: new assets and asset configuration changes, wherein the intermediate query is generated based, at least in part, on the inferred relationship rules and the scan query, wherein results of the intermediate query and the scan query form part of the event stream.

* * * * *